United States Patent
Clive-Smith et al.

(10) Patent No.: US 6,655,300 B1
(45) Date of Patent: Dec. 2, 2003

(54) ADJUSTABLE POST FOR CONTAINER

(76) Inventors: Martin Clive-Smith, Wootton Paddox, Leek Wootton, Warwickshire, England (GB), CV35 7QX; Christopher John Jones, Bracer Cottage, Ardens Grafton, Alcester, Warwickshire, England (GB), B49 GDS (*) Notice: Subject to any disclaimer, the term of this patent is extended or adjusted under 35 U.S.C. 154(b) by 0 days.

(21) Appl. No.: 09/743,777

(22) PCT Filed: May 12, 2000

(86) PCT No.: PCT/GB00/01820
§ 371 (c)(1),
(2), (4) Date: Mar. 16, 2001

(87) PCT Pub. No.: WO00/69756
PCT Pub. Date: Nov. 23, 2000

(30) Foreign Application Priority Data

May 12, 1999 (GB) ................................................ 9911097
May 17, 1999 (GB) ................................................ 9911483

(51) Int. Cl.$^7$ .................................................. B65D 6/16
(52) U.S. Cl. ....................................... 108/53.5; 108/55.1
(58) Field of Search ............................ 108/53.5, 54.1, 108/55.1, 55.3, 51.11, 147.21; 248/188.5

(56) References Cited

U.S. PATENT DOCUMENTS

| | | | | |
|---|---|---|---|---|
| 3,386,600 A | * | 6/1968 | Betjemann | |
| 3,459,326 A | * | 8/1969 | Betjemann | |
| 3,704,850 A | * | 12/1972 | Hendrickson et al. | ... 248/188.5 |
| 3,807,581 A | | 4/1974 | Nichols | |
| 3,850,295 A | * | 11/1974 | Black | ........... 108/53.5 |
| 3,905,334 A | * | 9/1975 | Stevenson | ........... 108/57.29 |
| 3,946,876 A | | 3/1976 | Jay | |
| 4,124,119 A | | 11/1978 | Nordstrom | |
| 4,151,925 A | | 5/1979 | Glassmeyer | |
| 4,295,431 A | * | 10/1981 | Stavlo | ........... 108/55.1 |
| 4,535,704 A | * | 8/1985 | Suttles | ........... 108/108 |
| 4,699,280 A | * | 10/1987 | Hoss | ........... 108/54.1 |
| 5,388,532 A | * | 2/1995 | Wakano | ........... 108/54.1 |
| 5,439,152 A | * | 8/1995 | Campbell | ........... 108/55.1 |
| 5,676,065 A | * | 10/1997 | Locker | ........... 108/55.1 |
| 6,227,397 B1 | * | 5/2001 | Kim | ........... 220/1.5 |

FOREIGN PATENT DOCUMENTS

| | | | |
|---|---|---|---|
| GB | 2303360 | * | 2/1997 |
| WO | 9809889 | | 3/1998 |

* cited by examiner

Primary Examiner—Janet M. Wilkens
(74) Attorney, Agent, or Firm—Edward S. Wright

(57) ABSTRACT

A container (41) has adjustable-span support posts (52)—to accommodate load height diversity and to meet external tunnel gauge through passage constraints—upstanding from a deck (46), with extendible post elements (53)—by multiple indexed, connector bar latching—carrying capture and handling fittings (54), accessed by localised extension above a load. Optional transverse post bracing is through a header beam (55), with optional arched profile, and/or coupled gate pairs upon opposed posts.

14 Claims, 15 Drawing Sheets

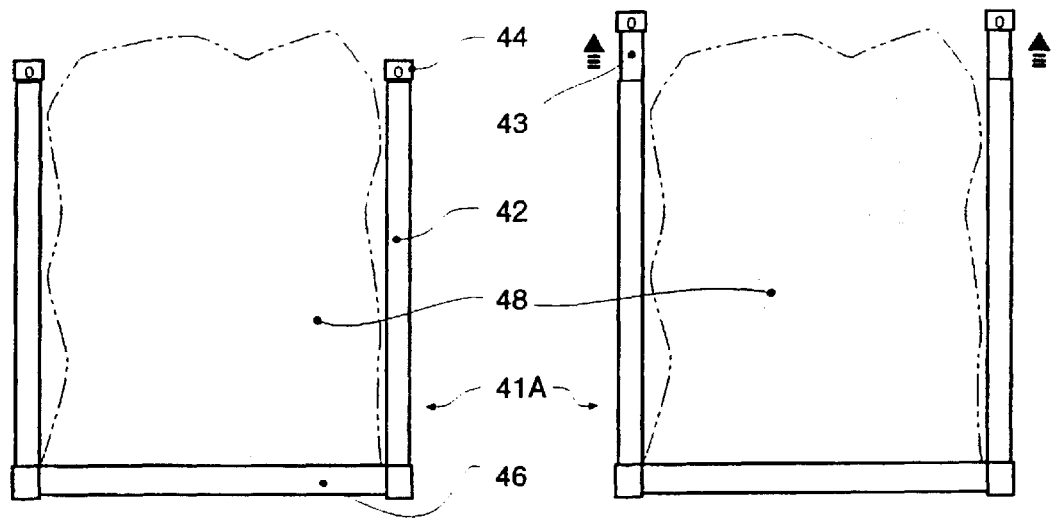
Figure 6A
Figure 6B
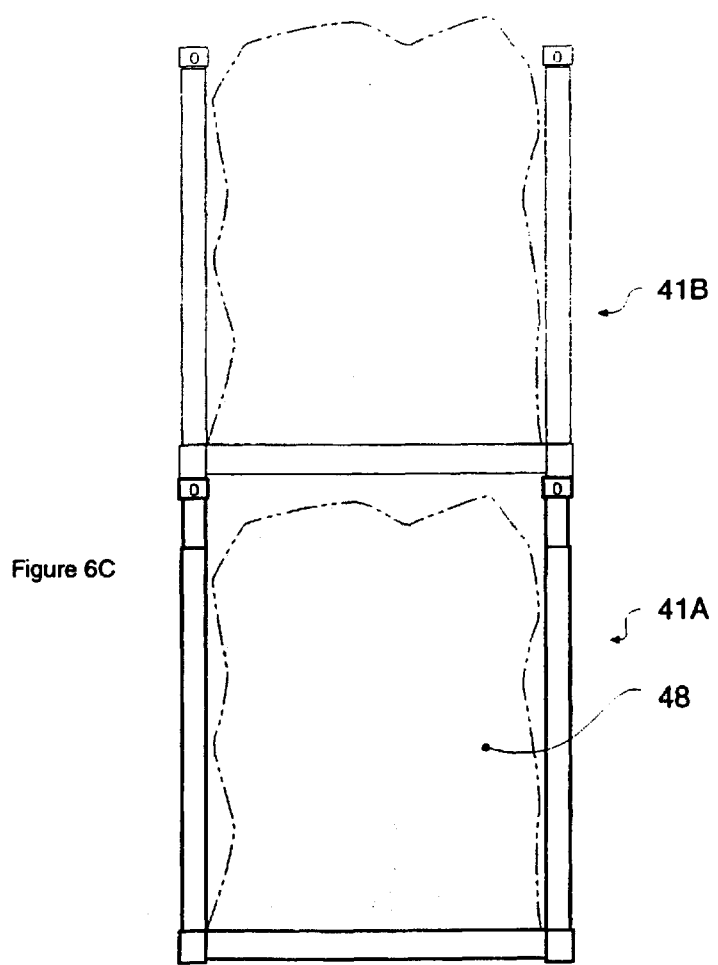
Figure 6C

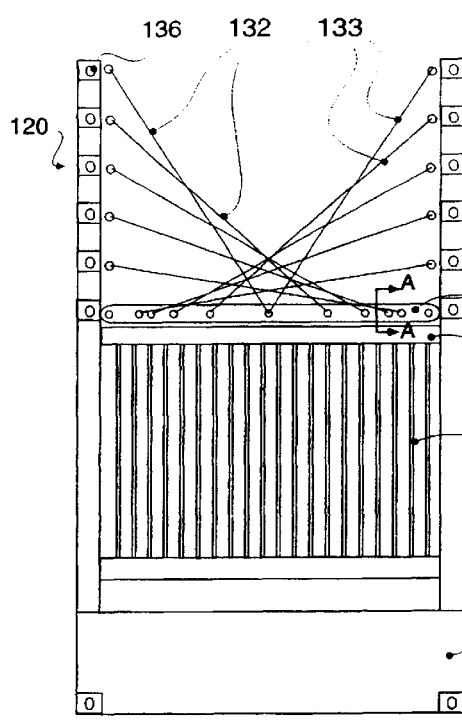
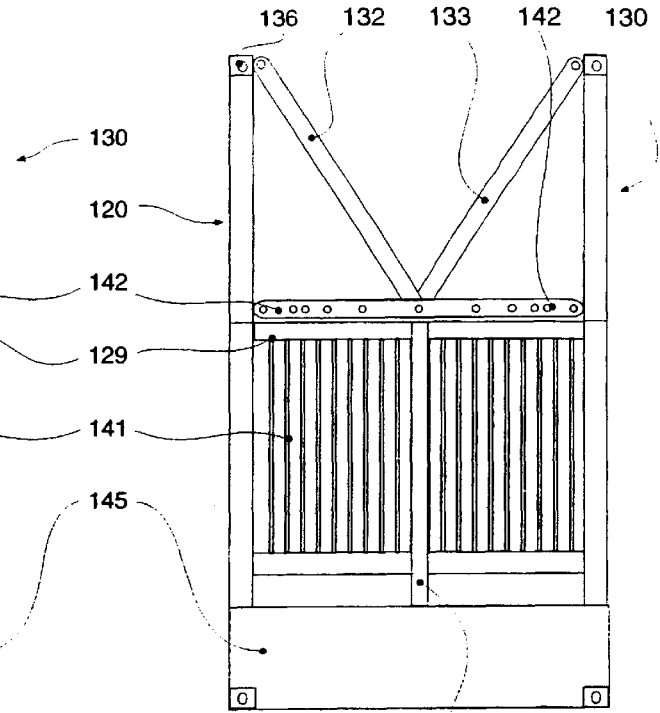
Figure 17A
Figure 17B
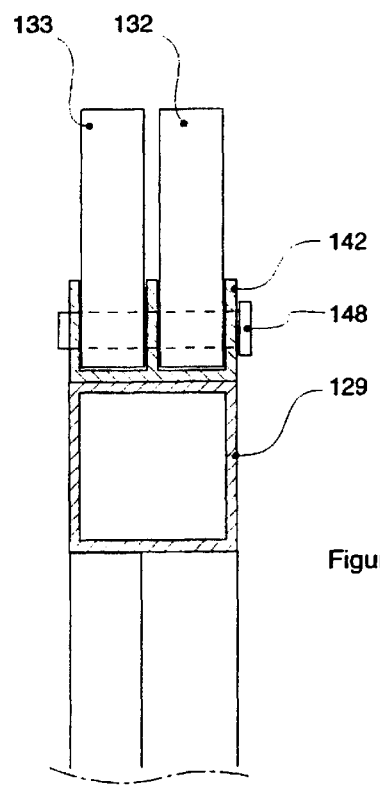
Figure 17C

ADJUSTABLE POST FOR CONTAINER

Some provision for varying, or adjusting, the configuration of containers, for (freight) transport and storage is known.

Such variability can be achieved by adjusting, re-locating, or even substituting altogether, certain key structural elements, such as elongate (support) struts, posts or ties, which define or reflect the overall container dimensional span, in particular height or depth in relation to a base platform.

Support Post Adjustability for Deck Variability

The Applicant's co-pending PCT(exUK) Patent Application No WO98/09889 (GB97/02319) envisages deck support post adjustability, in the context of deck position and orientation variability—for multiple mutually entrained decks within a common support structure.

Similarly, the Applicant's co-pending UK Patent Application envisages deck support post adjustability, in the context of deck position and orientation variability—for multiple independent deck module stacking.

Adjustability—Nature and Purpose

In principle, adjustability, or variability could be of diverse 'nature' and 'purpose'.

Nature, or characteristic, includes, say, height, depth (eg longitudinal extent—in the case of elongate elements), span, inclination or tilting, folding, location, mobility, demountability, or some combination of some or all such modes of variability.

Purpose, or rationale, includes meeting 'internal' dimensional and volumetric capacity requirements, and 'external', outer boundary, or peripheral constraints.

Internal means accommodating, or fitting around, a particular load profile and (base) footprint.

External means fitting within an outer (cross-sectional) profile, such as a (railway) tunnel gauge—to allow continuous passage, when in transit.

Flexible & Temporary

Yet variability in such internal or external demand factors, must be consistent with conformity to containerisation standards.

Thus (profile and/or dimensional) variability may be contrived as a temporary, flexible, measure.

Specifically, departure from containerisation standards is admitted—as when, say, a particular load or transport route dictates greater compactness, with reversion—say, at docking stations—for handling and (un)loading.

Variability also risks introducing penalties of constructional and operational complexity, with attendant issues of reliability, safety, serviceability and maintenance.

Rigidity—Bracing

Overall torsional rigidity, against racking or lozenging, or departure from a rectangular profile or geometry, must also be preserved.

Transverse, or diagonal, bracing for stabilisation must also allow, or be consistent with, configurational variability.

Transverse bracing includes so-called header beams, disposed at the upper end of support posts, a particular version of which is taught in published PCT Application WO90/01007(JP89/00724).

'Elegant' mechanical solutions are therefor desirable, for cost-effective installation and operation.

Collapsibility

Overall collapsibility of the container may also be a requirement, such as for compact stacking and 'return—empty/unladen' conditions.

Variable Span

Telescopic

In terms of variable span, telescopic configurations, with complementary inter-fitting elements are convenient.

Thus, a telescopic leg or strut, with a locking pin and receiving hole alignment, in a selected one of an array of multiple sites, has been proposed.

Folding

Similarly, a folding post, or rather a folding end portion has been proposed in WO90/01007.

Stacking Multiple Discrete Elements

An 'incremental', 'piecemeal', or multiple discrete element, (corner) support post construction is also known, by stacking individual (mutually entrained or discrete/severable) post elements, one upon another.

Integrated Manual Adjustment

Some aspects of the present invention address (corner) support post length, depth or span variability, or adjustment, through integrated, or on-board manual provision.

At any given adjustment level or station, the overall container structure must remain rigid and braced, in order to withstand (suspension or stacking) handling loads.

Similarly, the disposition geometry of post-mounted (end) 'capture' fittings must conform to prescribed standards for container handling and stacking.

Open-top Containers

In certain, so-called open-top, container configurations—where a load can protrude locally (beyond a container framework profile)—some (corner) support post adjustability can be employed, in order to preserve access to handling and support capture fittings, by taking those very fittings outside or beyond the load confines.

An example is an open-top container with a load, confined or bounded laterally by peripheral side walls, but allowed to protrude locally above nominal roof level.

Extendable (corner) support posts could allow the (corner) support post end capture fittings for container handling and support to be brought beyond the load profile.

In this way, standard container capture frames for crane lifts can still access, address and co-operatively interact with, on-board container support and handling capture fittings, at the (upper) end of each (corner) support post.

That said, even otherwise open-top containers benefit from transverse bracing, most conveniently at the upper ends of ((corner) support) posts.

Bracing

Another aspect of the present invention is concerned with adjustability of such transverse bracing provision.

Thus, for example, in one variant, a header beam is carried at the upper ends of extendible ((corner) support) posts.

Alternatively, a header beam is held captive toward the upper end of a non-extendible portion of a ((corner) support)

post, extendible upper portions of which can protrude beyond the header.

Movable Bracing

Movable transverse bracing can 'track', or follow, post span variability.

Thus, as a post 'telescopes' upwards or downwards, so a movable diagonal bracing strut between a post and deck, can be re-positioned, at different inclinations, to reach an upper post end, where bracing action is optimised—eg has more leverage or moment between post and deck.

Respective diagonal bracing between opposed posts can cross or intersect—and even be pinned together.

Thus bracing spars could 'rove' in adjacent respective adjustment planes, say upright from a deck, and shared with the associated post.

Bracing can be removably or demountably located upon both post and deck through pin and slot couplings, optionally with pin locking provision.

Flexible Capacity

Broadly, container transportation costs and charges reflect the volume enclosed.

Whilst the 'footprint', or base area, is largely constrained, for conformity with standard dimensions, there remains some scope for different height, or depth—to reflect particular load configurations.

So, relatively shallow or tall container configurations could be contrived, on a common platform.

Depth variability can reduce redundant voids around, and in particular above, loads.

Moreover, multiple discrete shallow containers can be stacked one upon another.

Stacking can be to a standard container height or depth, or multiples thereof.

An overhead crane lift or hoist can address containers of such different height, with the same suspension fitting locations, reflecting the common footprint or plan.

Design Considerations

Whether for internal capacity variation of external route constraints, provision of reliable, fail-safe, yet economic height or depth variability poses special design considerations.

Generally, a standard container has a rectangular base platform, surmounted by support posts or struts, typically at, or (closely adjacent) each (corner) support.

Intermediate Post Location

Some aspects of the present invention envisage support posts at intermediate positions, for example mid-span, or somewhat offset from, inboard, or outboard (say, on chassis rail extensions) from the (corner) support extremities of a base platform.

Open vs In-Fill Side Walls

The container may be open, or open-sided, that is configured as an open lattice with no in-fill spanning between (corner) support posts.

Roof

Alternatively, a greater or lesser degree of side wall and indeed overlying roof in-fill may be provided.

Collapsibility—Posts & Walls

Some (collapsible) container variants have folding (eg hinged or pivoted), demountable, or removable, such (corner) support posts.

Similarly, some container variants have a plurality of side walls.

In practice, sides walls may be configured as in-fill panels between (corner) support posts.

Thus, collapsible containers with folding [say hinged or otherwise pivotally mounted to the base] or even removable side walls are known.

Flat-rack

A common configuration is a base with folding opposed end walls—sometimes referred to as a 'flat-rack'—which allows a compact collapsed, flat-bed, container configuration for return-empty, with one collapsed container stacked upon another.

Terminology

For convenience of terminology in this disclosure—and leaving aside overall container orientation—the dimension, or dimensional axis, orthogonal to the base is regarded as the height, or depth. This assumes a level base reference plane.

Statement of Invention

According to one aspect of the invention, an adjustable-span support post, for a container, has relatively movable post elements, carrying container end capture and handling fittings, to accommodate different internal load heights, and to meet external profile constraints, —such as for tunnel gauge through-passage.

Telescopic

Thus some variants of the invention could comprise essentially a telescopic strut with an internal latching, locking and adjustment provision.

Folding Post Extension

Other variants could employ mutually inter-coupled, hinged post or strut elements, with a relatively shorter element hinged to upper end of a relatively longer element.

Header

Opposed pairs of (corner) support posts or struts at the same end of a container could be bridged, say, at or adjacent their upper ends, or mid-set, by a transverse bracing beam, or header, spanning the entire container width.

The header could itself be movable, along with, or relative to, attendant (corner) support posts—by say extension or retraction of supporting (corner) posts, or by some elevator (say, ram, cable or chain hoist) provision carried by the posts.

In this way, the header could be selectively transposed between an optimum bracing position, for load transit, and a 'clearance' position for end load access.

Similarly, loads of various height or depth could be accommodated—and even allowed to protrude somewhat beneath a header.

This would be particularly useful in a dedicated vehicle transporter, with vehicle bonnets/hoods or boots/trunks allowed to protrude somewhat beyond a deck.

Moreover, the header could be split, or fragmented, with say co-operative header 'gate' portions, individually pivotally mounted from opposite (corner) support posts, and which could be uncoupled and swung aside, for end load access.

Tunnel Gauge

In railway wagons the overall container profile must conform with a profile or cross-section, which takes account of tunnel gauges and overhead obstructions, such as signal gantries and power supply catenary.

In the case of tunnels, the external constraint is not rectangular in form, but rather of tapering or waisted upper profile into a concave arch.

In order to accommodate this, a transverse bracing beam, bridge or header may have a 'tunnel gauge' outer/upper profile—such as a stepped arcuate form—for conformity with road or, more likely, railway tunnel sectional constraints.

It is known, per WO90/01007, to profile the bridge piece into a complementary arched form.

Of its nature, such an arched beam protrudes, at least at its mid-span, somewhat above the height of the (corner) support posts—which, being at the outer extremities of the container footprint, have their height constrained by the tunnel gauge.

The support posts may have extendible end portions, to allow selective 're-assertion' of container height (or depth) for the stacking and pick-up points, when so allowed, outside tunnel gauge constraints.

Reversion to tunnel gauge profile conformity, simply requires retraction of the (temporary) localised post extension.

Statement of Invention

One aspect of the present invention provides a container with extendable support posts, disposed in opposed pairs about a deck, and spanned by a transverse bracing beam or header, with an upper post element, selectively extendible, to at, or above, the level of the header, for access to container capture and handling fittings carried thereby.

This enables overall container capture by, say, an overhead cradle, itself suspended, by a sling, from an overhead crane (jib or gantry).

An alternative means of raising (and lowering) ((corner) support) post upper ends and attendant (capture) fittings could employ opposed pairs of hinged arms.

These arms could be pivoted—at their inboard ends—to the arch and carry the capture fittings at their outboard ends.

The capture fittings can be brought generally level with, or somewhat above, the arch span, by pivoting the arms about their respective inboard ends.

Post Span Adjustment Mechanism

In principle, a diversity of (relative positional adjustment) mechanisms—disposed, either internally (ie within hollow post cross-sections) and/or externally—could be employed—either singly or in combination—to effect or implement relative movement, (re-) disposition and/or (re-) orientation, of multiple discrete individual post elements.

Thus, for example, a pulley and cord (eg wire rope, cable or chain) could implement raising (or 'jacking'), or lowering of post elements, by traversing the cords—or a continuous cord loop—about rotating pulleys.

The (threading or looping) path of cords about a pulley array adopted could reflect the desired mechanical advantage, or velocity ratio, of post lift and movement span.

Alternatively, a rack and pinion drive could be employed, with a linear array of rack teeth upon a rack carried by one post element, engageable with a rotary toothed pinion, or non-rotary pawl or claw, mounted upon another post element.

The need for either an active drive, or passive follower, mechanism in each of at least four (corner) support posts imposes a cost multiplier—dictating cost-effective solution.

Statement of Invention

According to another aspect of the invention, an adjustable-span, support post, comprises a manually-operable connecting, latching and support bar, pivotally mounted, at one end, upon one of the elements, with its other end selectively insertable in a recess or notch, in a capture block or plate(s) carried by the other element.

Rectilinear or Rectangular Support Bar Profile

A rectilinear, or rectangular, cross-section bar profile—and complementary rectilinear, or rectangular, support and/or capture surface profile are desirable, in order to spread loads more evenly, than say a round section.

The connecting bar could be entrained to one of the elements through a capture pin, which forms a (slack) pivot for the bar.

The other end of the connecting bar could carry a transverse cross-bar, in a 'T'-bar termination, to locate—and be held securely fast—within spaced slots in a gate fastened to the other member.

A desirable option is to embody a slight slant or cant to the slot orientation in relation to the connecting bar load transmission axis, so that loading tends to drive the 'T'-bar termination transversely, even more securely into the slot.

Thus, in order to release the connecting bar, a combination of load relief and deliberate longitudinal and lateral displacement is required.

In addition, a separate or discrete latch or lock mechanism could be selectively operable to inhibit inadvertent displacement of the connecting bar from its end restraint.

Adjacent the 'T'-bar could be provided a handle for manual operation of the connecting bar.

In the case of hollow enclosed (telescopic) post sections, the handle could be accessed through a (generous) aperture in the side wall of the outer post element, with location slots for the 'T'-bar termination visible through other, smaller, apertures.

As a minimum only two operational heights need be accommodated—reflected in fully extended and fully retracted (corner) support post conditions.

In the or each condition, the post height is desirably securely locked, to withstand either compression or stacking loads or tension or suspension loads.

In a particular construction, multiple—ie two or more—post elements are mutually telescopic.

Thus an upper element could be fitted within a lower element—or vice versa.

Telescopic Profiles

Telescopic requires element profiling to accommodate another element.

One cross-sectional profile could embrace another, or the profiles could inter-nest. The element cross-sections could be open or closed—such as hollow inter-fitting cross-sections.

Element cross-sections may be complementary, for snug inter-fit—or quite disparate, such as, say, a circular-section, or tubular, inner element, freely locatable within a rectangular (eg square) section outer element.

For open sections, a diversity of profiles may be adopted, such as (inter-nesting) 'I'-beams, (right or acute) angle 'V'-sections, 'C'-sections, or the like.

Statement of Invention Review

Reviewing various aspects of the invention:

{Adjustable Post Span & Transverse Bracing Header}—A container may comprise a load deck, with a plurality of upstanding support posts, carrying at their respective upper ends, container capture and handling fittings, and a transverse header beam between posts on opposite deck sides, the post span being adjustable, to present the capture and handling fittings, for access above the header.

Whilst post adjustability is advantageous with a header, for access to end fittings, a header, and attendant profiling or header adjustability, could be used with a non-adjustable post—say to provide transverse bracing.

Similarly, ancillary post-mounted features, such as end access and/or load restraint gates, doors or split-headers, along with deck coupling, are not confined exclusively to adjustable posts.

{Tunnel Gauge/External Constraint Conformity}—The post span may be retractable, to bring the container cross-section, to within an external constraint, to allow container through passage—such as within a prescribed tunnel gauge.

{Mobile Header}—A header may be movably mounted.

{Header Mounting Upon Movable Post Elements}—A header may be mounted between movable opposed post elements.

{Header As End Gate}—A header may be disposed to determine deck end access and load restraint.

{Transverse Bracing}—A header may provide transverse bracing.

{Deep Header}—A header may be of deep cross-section, and configured as a beam, barrier, wall, gate or door.

{Split Header}—Discrete movable header portions may be individually mounted upon respective support posts.

{Split Header As Gate}—Header portions may be disposed as movable end gates, or doors.

{End Gates & Coupling}—End gates or doors may be hung in opposed pairs, from respective support posts, with a gate coupling, operable to combine the gates, into a transverse post brace.

{Gate-To-Deck Coupling}—A coupling may be operable between a gate and deck, for attendant support post bracing.

{Multiple Deck Gate Coupling}—Multiple decks may share a common end gate or door, with couplings operable between decks and gate.

{Mobile Bracing}—Mobile bracing, for individual support posts may, be provided between extendible post elements and a transverse rail between posts, movable with post element extension.

{Dedicated Vehicle Transporter}—A container may be configured for dedicated vehicle transportation.

{Railway Wagon}—A container may be configured as a railway wagon.

{Support Post & Connector Bar}—A support post of adjustable span may comprise relatively movable post elements, inter-coupled by a connector bar.

{Connector Latch}—A support post may have connector bar to post element latching, for pre-determined, relative positional adjustment.

{Movable Brace}—A support post of with a transverse brace—for example configured as a diagonal strut or tie—movable to track post adjustment.

Embodiments

DESCRIPTION OF DRAWINGS

There now follows a description of some particular embodiments of the invention, by way of example only, with reference to the accompanying diagrammatic and schematic drawings, in FIGS. 1A through 1C show longitudinal sectional views of a telescopic, two-part, (corner) support post or strut, of complementary, mutually inter-fitting upper and lower post elements, with an integral (manual) operating, latching and support bar, in various operating conditions.

Thus, more specifically.

Figures 2A, 2B:
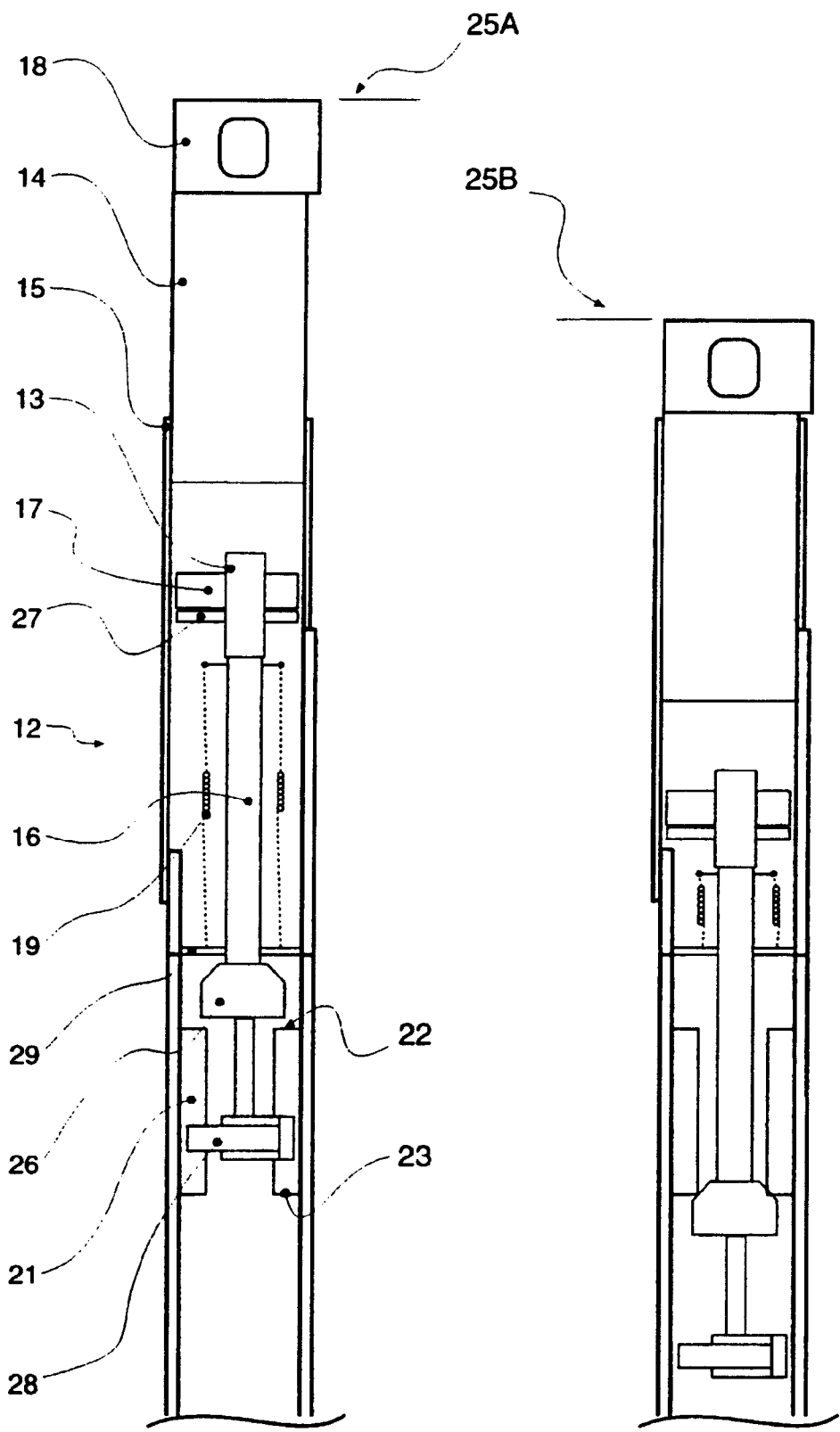
FIGS. 2A and 2B show longitudinal sectional views of the post of FIGS. 1A through 1C, but taken from another side.

Thus, more specifically:

FIG. 2A shows the post in its fully extended condition, with attendant operating bar latching and support, under spring bias; and FIG. 2B shows the post in its fully retracted condition, with operating bar retracted against an internal spring bias.

Figure 1A:
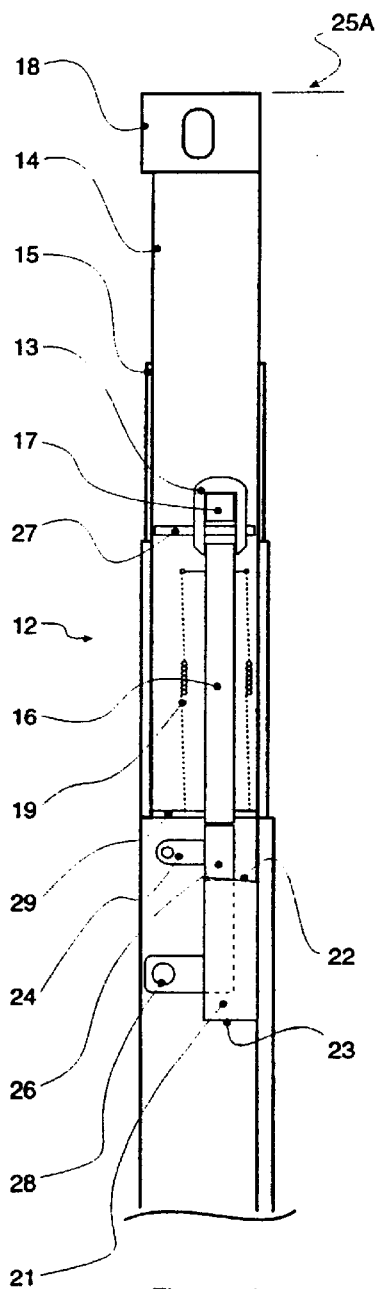
FIG. 1A shows a post in a fully elevated or extended condition, with an operating bar latched in an (upper) support position, impeding elevation or retraction of an upper movable post element.
Figure 1B:
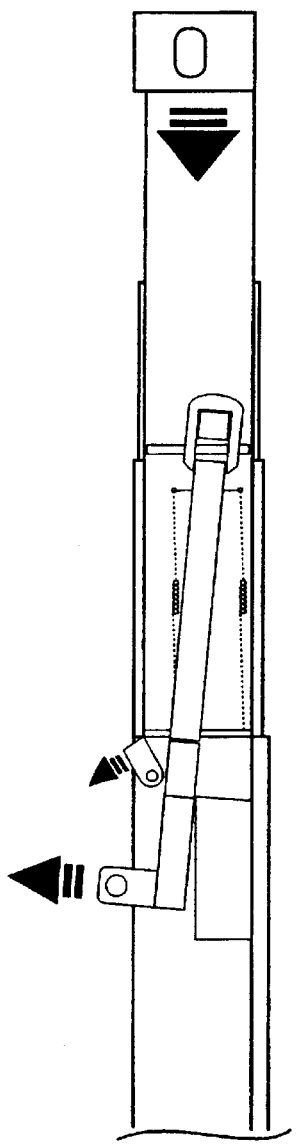
FIG. 1B shows a post in an intermediate condition, between full extension of FIG. 1A and full retraction of FIG. 1C, with operating bar unlatched.
Figure 1C:
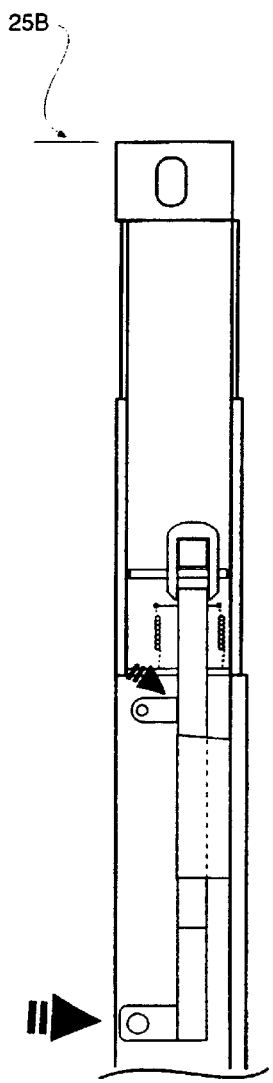
FIG. 1C shows a post in a fully retracted or lowered condition, with operating bar latched in a (lower) position, impeding post extension.
Figures 3A, 3B, 3C:
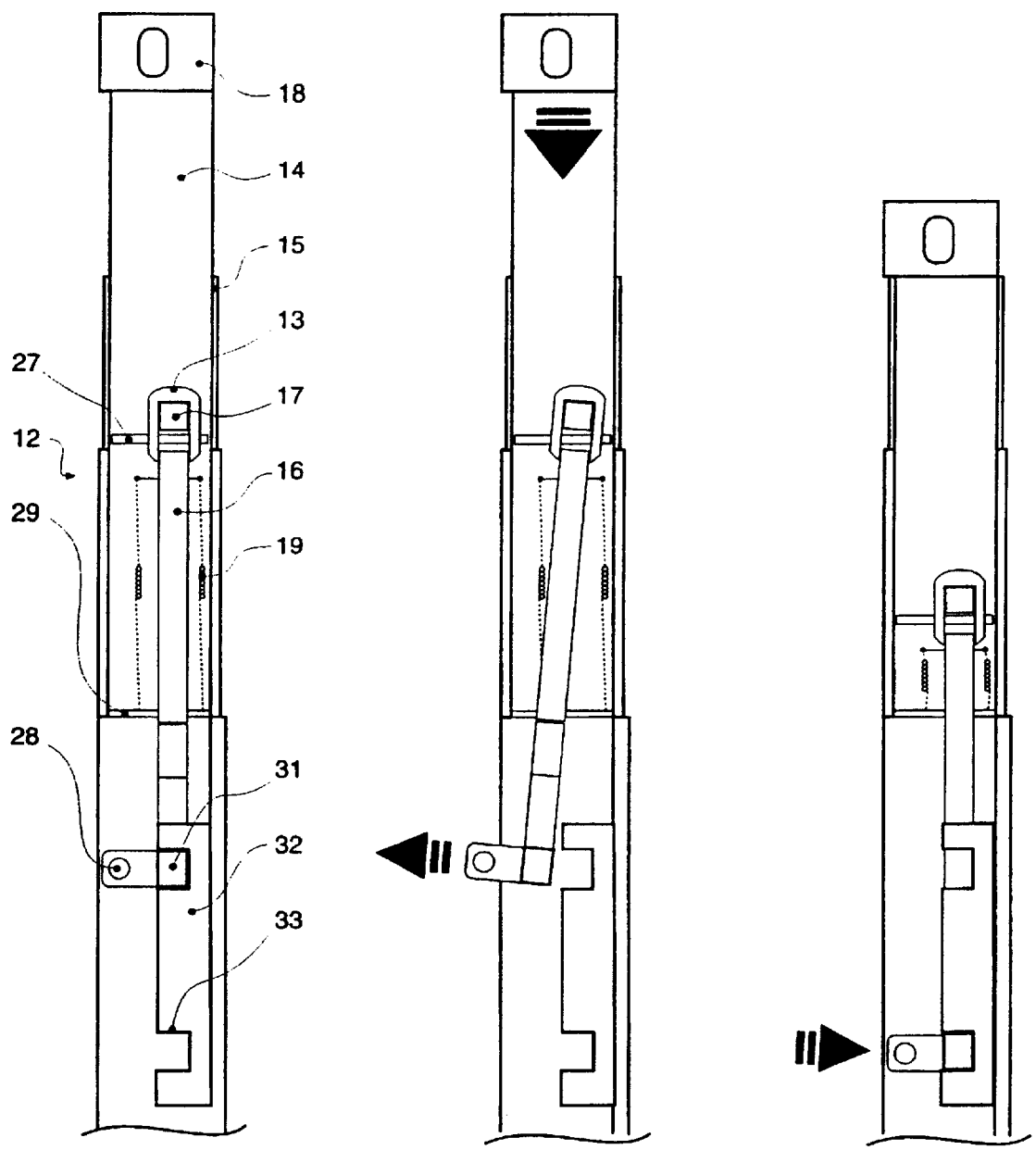

FIGS. 3A through 3C show corresponding sectional views of an adjustable (corner) support post construction and operational stages to those of FIGS. 1A through 1C respectively—but of a variant construction, with multiple slot latch detent, for a swing-action connecting bar between upper and lower post elements.

Thus, more specifically:

FIG. 3A shows an internal operating, latching and support swing bar, latched in an upper support position, with the (upper) post element fully extended;

FIG. 3B shows the mechanism of FIG. 3A, but with the swing bar (temporarily) unlatched, to allow relative (telescopic) re-positioning of (upper and lower) post elements; and FIG. 3C shows the mechanisms of FIGS. 3A and 3B, with the swing bar latched in a lower detent position, with the (upper) post element retracted somewhat.

Figures 4A, 4B, 4C:
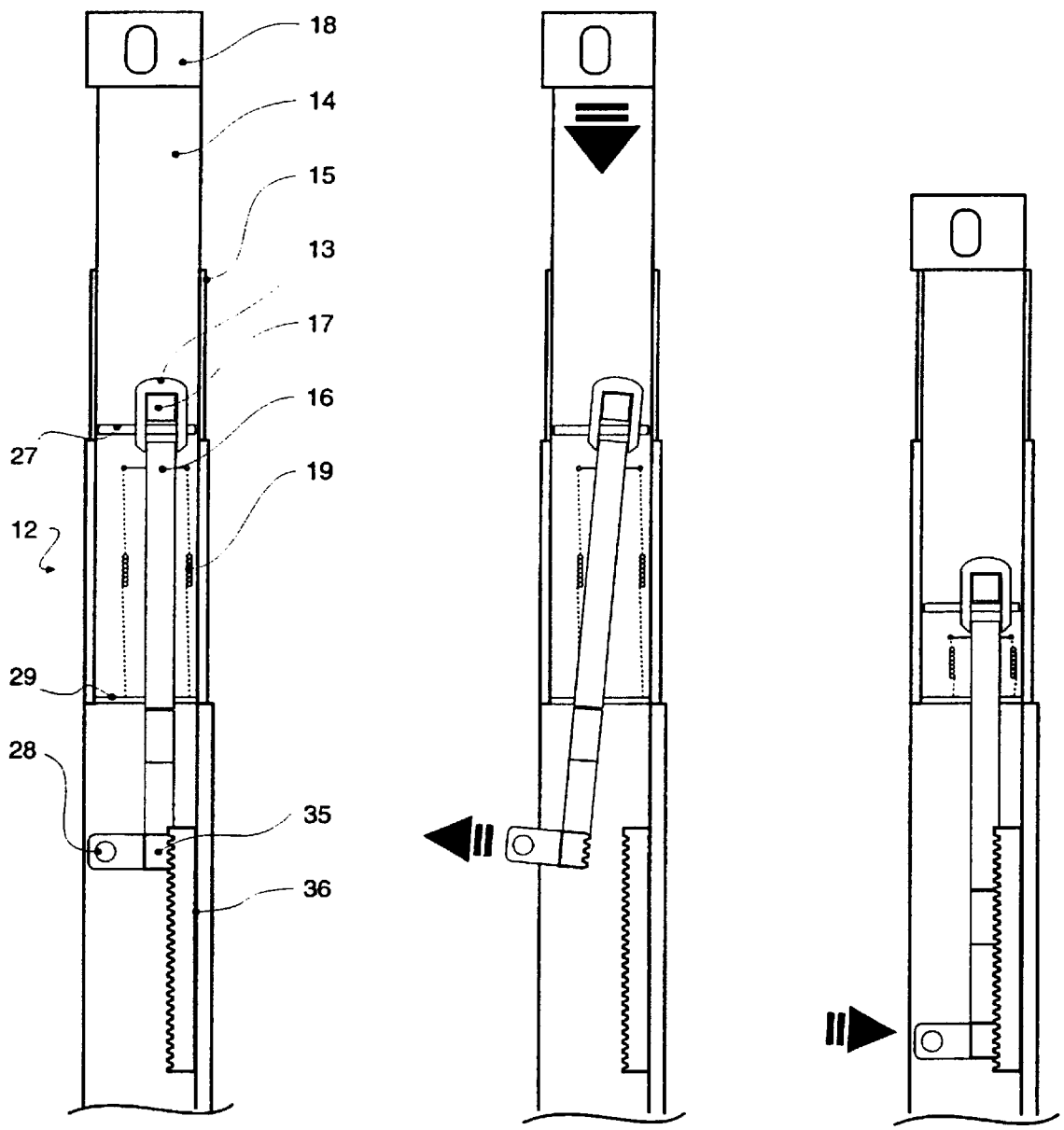

FIGS. 4 through 4C show another variant of the (corner) support post adjustability to FIGS. 1A through 3C, incorporating a toothed rack and complementary (non-rotary) pinion or pawl.

Thus, more specifically:

FIG. 4A shows an operating, latching and support bar latched in an upper detent position on a position indexing rack, with an upper post element fully extended;

FIG. 4B shows the operating bar of FIG. 4A unlatched, allowing relative re-positioning movement of upper and lower post elements; and FIG. 4C shows the operating bar of FIGS. 4A and 4B in a lower detent position on the positioning rack with the upper post element fully retracted.

Figure 5A:
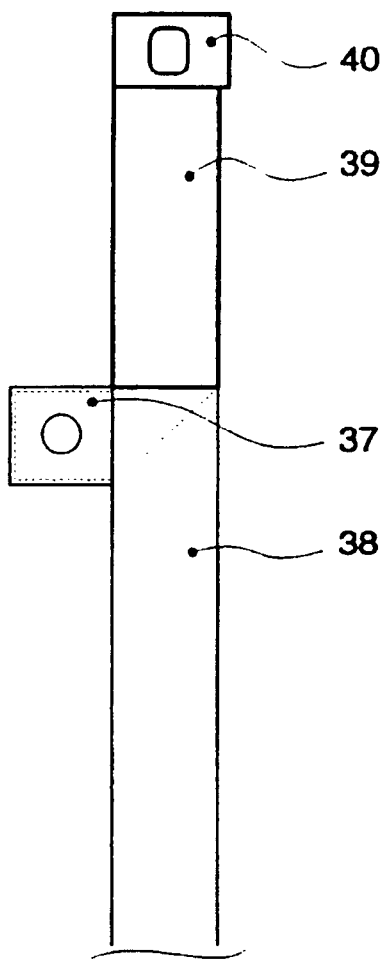
Figure 5B:
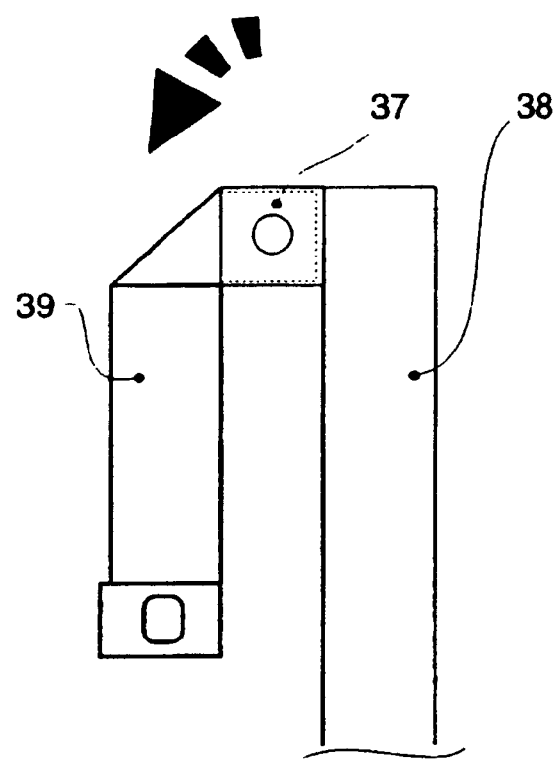

FIGS. 5A and 5B show an alternative (corner) support post extension facility, by hinging an end post element.

Thus, more specifically:

FIG. 5A shows an 'erected' (corner) support post upper end element, deployed to overlie, and align with, a lower (corner) support post portion; and FIG. 5B shows the end element of FIG. 5A swung down about the upper end of a lower (corner) support post element, to shorten the overall post length and so height;

FIGS. 6A through 6C show sectional views of an open-top container, with in-filled side walls and (corner) support post extension and stacking, and in which a cargo is allowed—albeit temporarily (say, between docking stations)—to protrude locally somewhat above the container notional roof level, whilst confined within the base footprint of a load support platform.

Thus, more specifically:

FIG. 6A shows an upwardly protruding cargo in a single container;

FIG. 6B shows localised (corner) support post (telescopic) extension (such as by the mechanisms of FIGS. 1A through 2B, or FIGS. 3A through 3C, or FIGS. 4A through 4C), to bring capture fittings, carried at their upper ends, to an access position somewhat above the protruding cargo level; and FIG. 6C shows stacking of the containers of FIG. 6A, with lower (corner) support posts extended as in FIG. 6B, to match or somewhat beyond cargo protrusion.

Figure 7A:
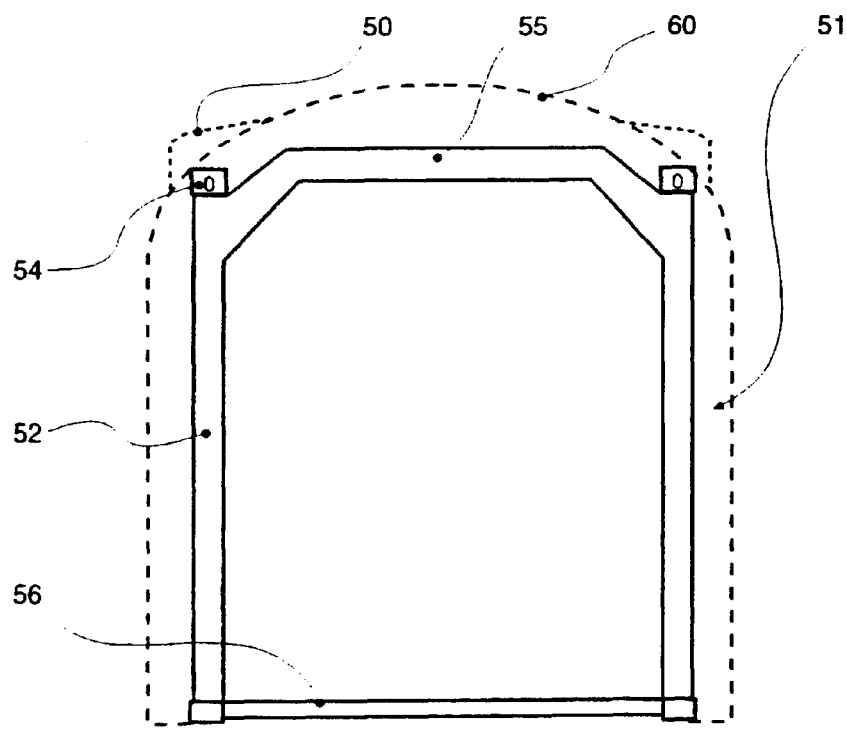
Figure 7B:
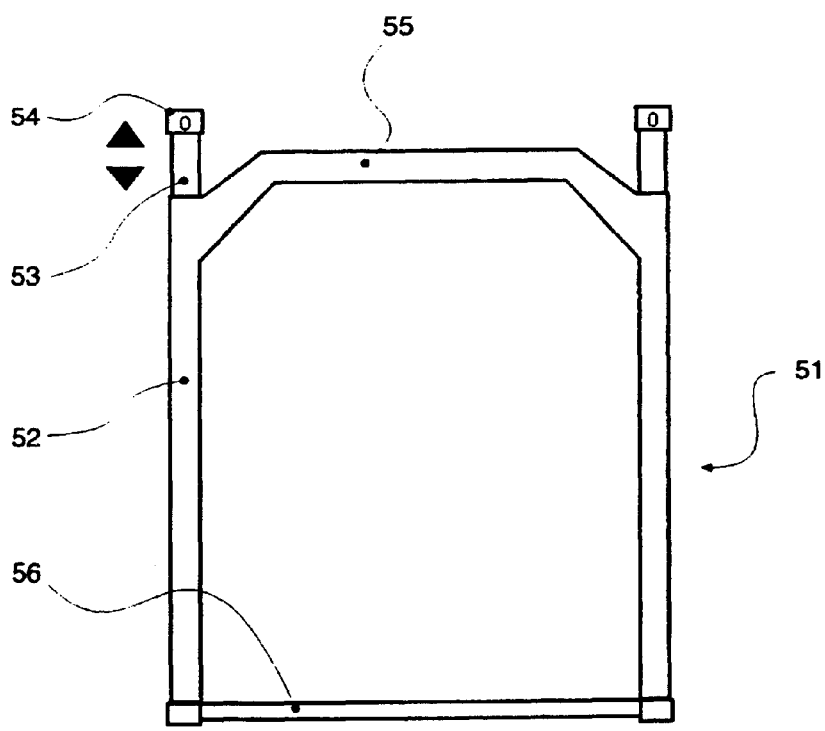

FIGS. 7A and 7B show end elevations of an open-sided, container, with opposed (corner) support posts, mutually braced, by a transverse bridge or header beam, spanning their upper ends; and configured for use as a railway wagon, with bespoke contouring or profiling, for conformity with prescribed tunnel gauges.

Thus, more specifically:

FIG. 7A shows a container with (corner) support posts retracted, to generally below header beam height, to allow tunnel gauge through-passage of the container, with a certain intervening working clearance; and FIG. 7B shows the container of FIG. 7A, with (corner) support posts extended, to generally at, or somewhat above, header beam height, for access to container handling end fittings.

Figure 8A:
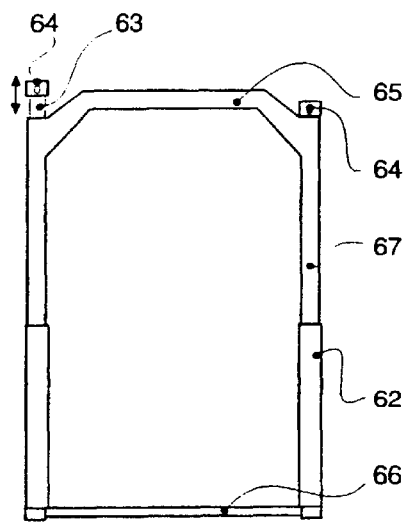
Figure 8B:
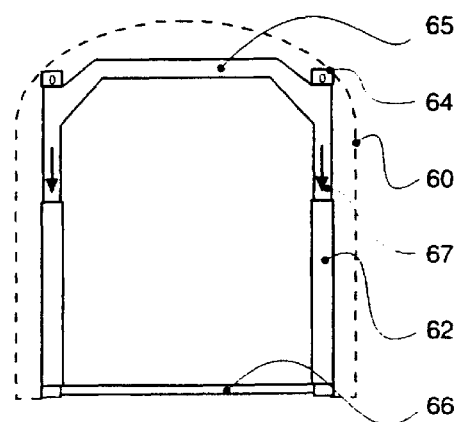

FIGS. 8A and 8B reflect a variant of the variable load capacity container of FIGS. 6A through 6C through support post extension, combined with a variant of the bracing header configuration of FIGS. 7A and 7B; and in which the header itself is carried upon extendible support posts to accommodate taller loads, yet individually further extendible, for access to end capture fittings.

Thus, more specifically:

FIG. 8A shows a movable header beam in an extended position, for greater load height or depth capacity, and for greater (end) access upon (un) loading; and FIG. 8B shows the movable header and attendant support posts retracted, to fit within an external tunnel gauge profile constraint.

Figure 9A:
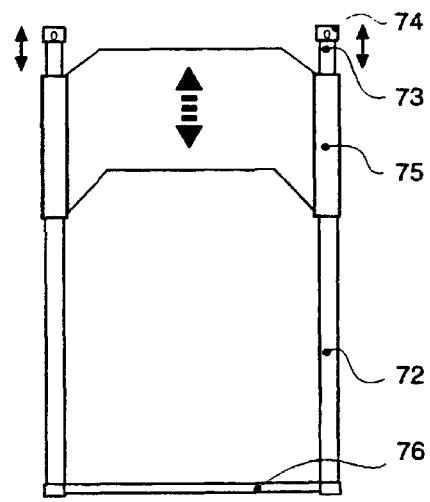
Figure 9B:
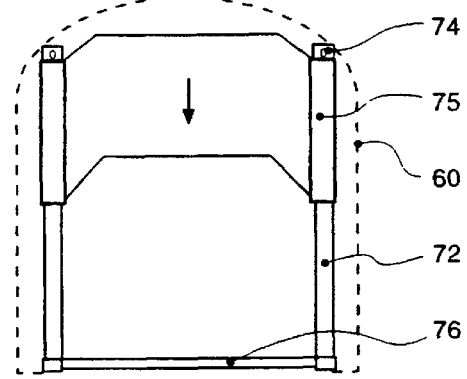

FIGS. 9A and 9B show a variant of FIGS. 8A and 8B, using a movable header, configured as a traveller upon opposed lateral support posts, themselves with individual extendible ends, and with a deeper section header 'throat' profile, for enhanced transverse bracing and overall container torsional rigidity—and also available to form and end access barrier for load restraint.

Thus, more specifically:

FIG. 9A shows a deep header in an extended position, for greater load height or depth capacity and enhanced (end) load access; and FIG. 9B shows the deep header, and attendant support posts, retracted to fit an external tunnel gauge profile constraint.

Figure 10A:
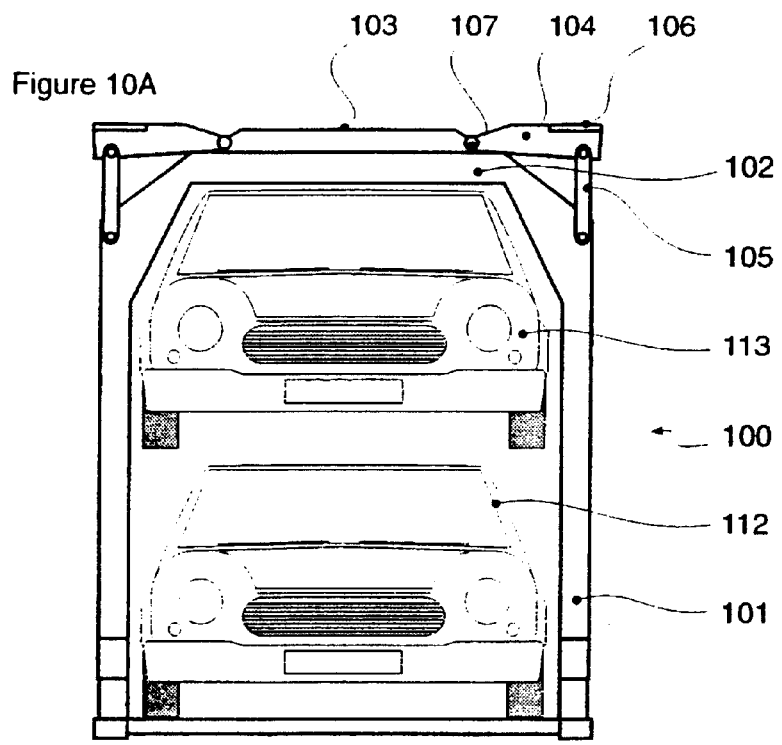
Figure 10B:
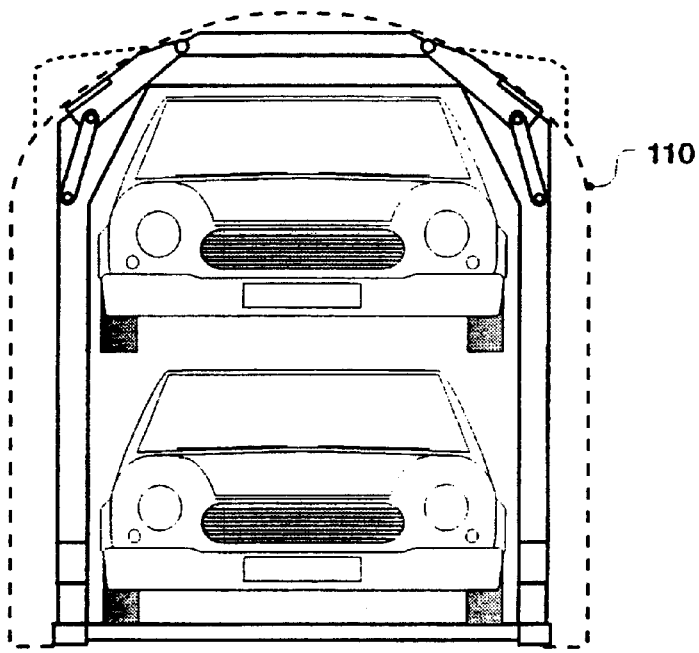

FIGS. 10A and 10B show—respectively in erected and collapsed conditions—front elevations of a double-deck or two-tiered vehicle transporter, with provision for relative deck height and spacing adjustment, together with an adjustable over-frame for conformity with standardised rail tunnel profiles.

Thus, more specifically:

FIG. 10A shows a tiered container in an 'erected' configuration preserving an overall rectangular outer boundary profile, allowing access to handling and support fittings, carried on hinged 'ears' or 'wings', at the upper corners; and FIG. 10B shows the container of FIG. 10A re-configured into an arch-top profile, with opposite upper corner ears retracted to fit within a prescribed (railway) tunnel gauge, temporarily precluding access to handling fittings; if necessary the load could be repositioned, by say bringing an upper deck towards a lower deck.

Figure 11:
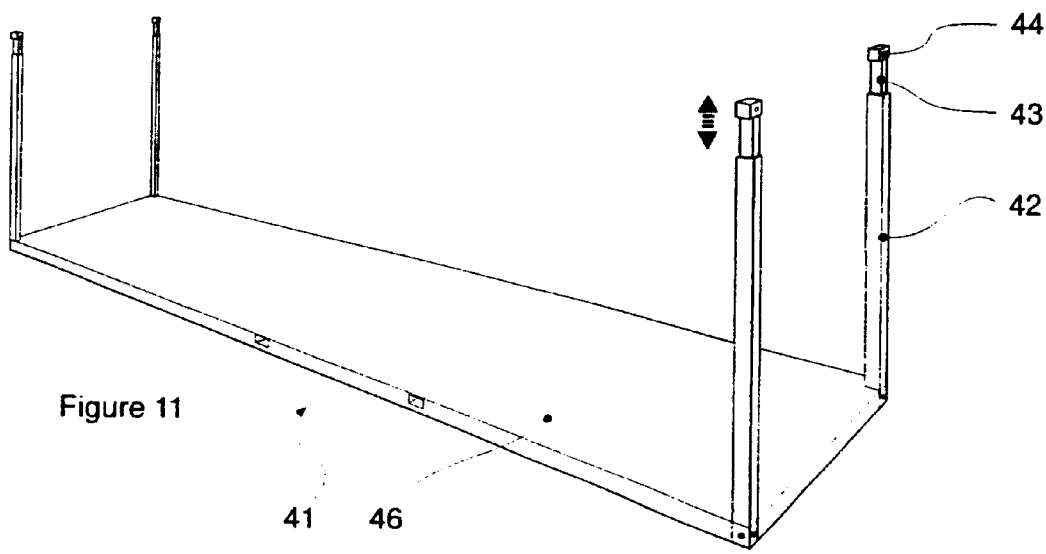

FIG. 11 shows a three-dimensional perspective view of an open-sided container, with individually adjustable (telescopic) corner support posts—for example incorporating the operating, latching and support mechanism of FIGS. 1A through 2B—to achieve alternative overall load heights, including those meeting prescribed containerisation coy ration standards.

Figure 12:
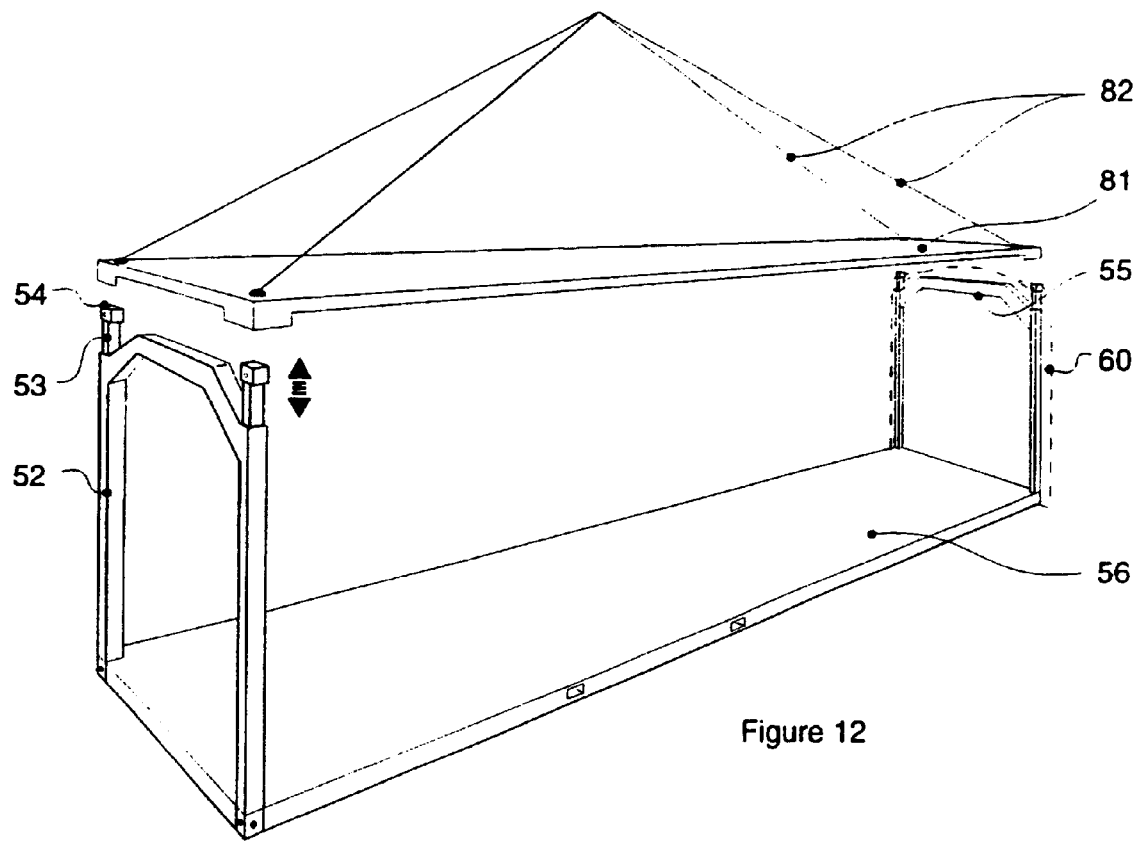

FIG. 12 shows a three-dimensional perspective view of a dedicated railway container, such as depicted in FIGS. 7A and 7B, with opposed pairs of (corner) support posts, at opposite ends of a platform chassis, braced at their upper ends by an arched bridge header beam, to achieve an overall sectional profile meeting a prescribed railway tunnel gauge; and with extendable upper portions of the corner posts to bring capture fittings at their upper ends above the arch level and thus accessible to an overhead support cradle carried by a suspension sling.

Figure 13A:
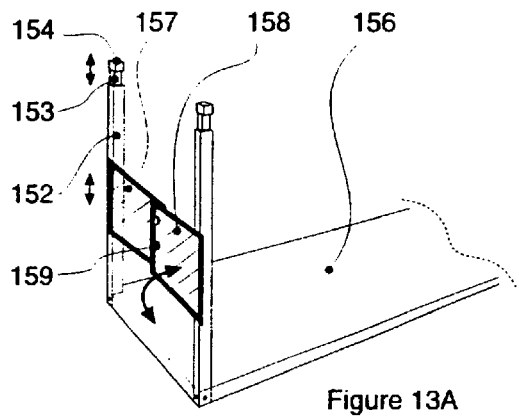
Figure 13B:
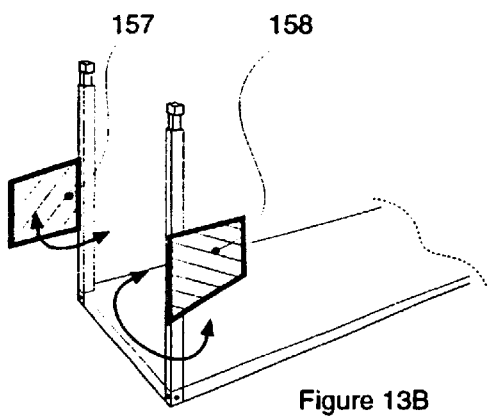

FIGS. 13A and 13B show opposed hinged end gates, set at mid-height.

Figure 14A:
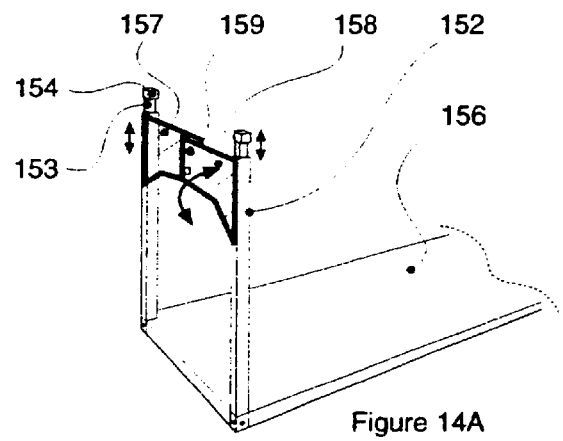
Figure 14B:
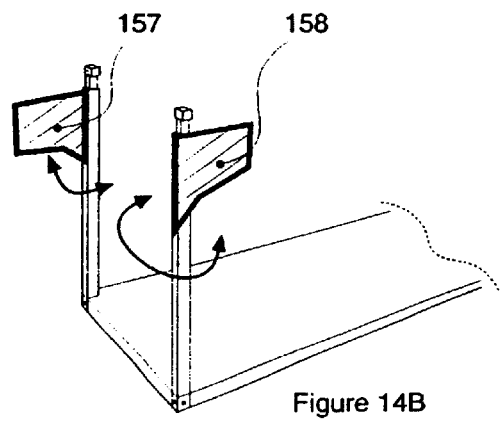

Thus, more specifically:

FIG. 13A shows shallow-depth end gates, set at an intermediate height above a container platform deck and hinged from respective opposed (corner) support posts, closed—and lying transversely of an underlying container deck, to impede end access and serve as an end load restraint and, when inter-coupled, (say, latched or locked together) to provide transverse bracing; and FIG. 13B shows the end gates of FIG. 13A uncoupled and swung open, to allow container end access;

FIGS. 14A and 14B show a variant of the intermediate-set end gates of FIGS. 13A and 13B, contrived by a split transverse header beam, with opposed hinged header beam portions configured as end gates.

Thus, more specifically:

FIG. 14A shows a split header with opposite header gate portions closed together, and desirably inter-coupled to impart transverse bracing, impede end load access and serve as end load restraint; and FIG. 14B shows the split header gate portions of FIG. 14A uncoupled and swung open for end load access.

It should be appreciated that the spilt header gates of FIGS. 14A and 14B could be combined with the header mobility of FIGS. 8A and 8B or FIGS. 9A and 9B, or simply in conjunction with extendible (corner) support posts of FIGS. 7A and 7B.

Figure 15A:
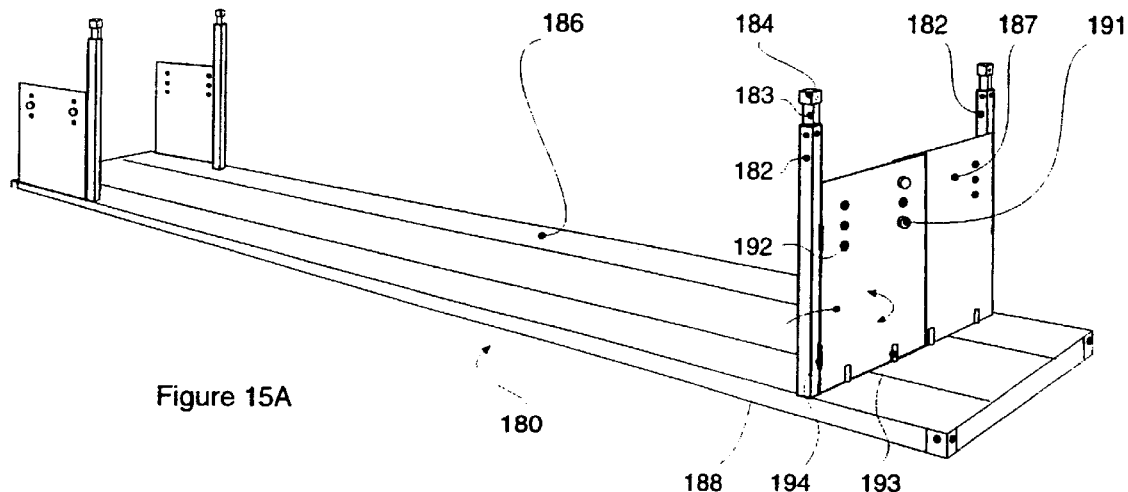
Figure 15B:
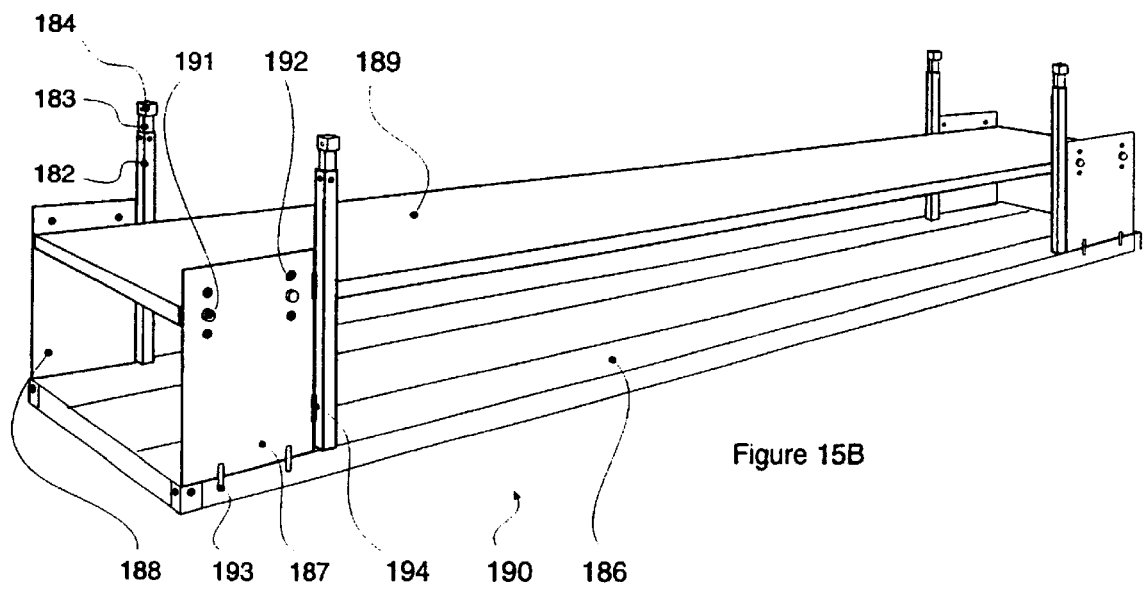

FIGS. 15A and 15B show a variant configuration and role for movable end gates, to those of FIGS. 13A and 13B or FIGS. 14A and 14B, for bracing other container elements, in particular (corner) support posts and deck platforms; and applicable to either single or multiple-deck, differential deck height, container configurations.

A particular application would be as a dedicated vehicle transporter, configured as a railway wagon.

Thus, more specifically:

FIG. 15A shows a single deck container configuration, with deep end gates, extending down to deck platform level, hung from opposed support posts, and movable to align either longitudinally with the deck sides (and in doing so allowing end access), or transversely across the deck (impeding end access and providing end load restraint)—in either case when, coupled to the deck, (for example, by latches or slide bolts), to brace an attendant post to the deck; and FIG. 15B shows a multiple (in this case twin) deck container, with end gates (temporarily) aligned longitudinally with the sides of both decks, and secured thereto, with adjustable pin and slot coupling, through removable coupling pins and an array of apertures in the gate wall, for mutual deck interconnection and bracing.

Figure 16B:
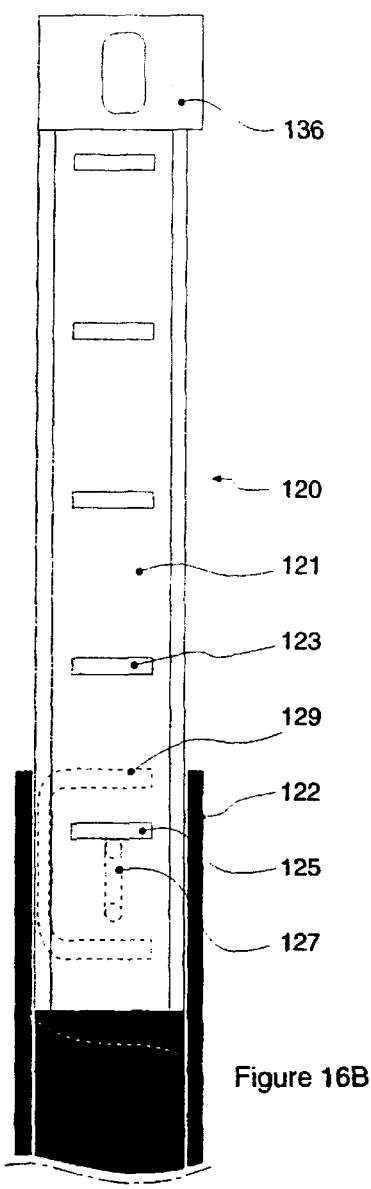
Figure 16A:
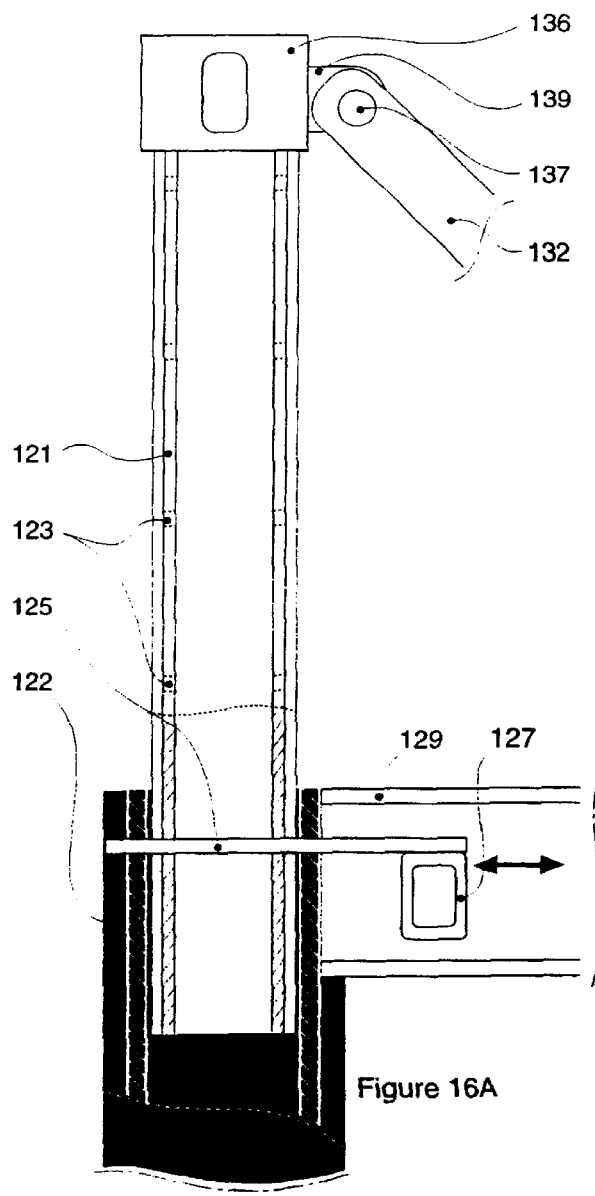
Figure 16C:
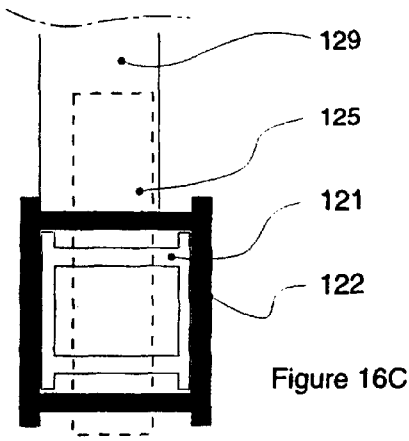

FIGS. 16A through 16C show the integration of extending (corner) support posts and an end wall, employing a variant telescopic support post, along with movable diagonal bracing to a post upper end, over its range of movement.

Post latching and support is through a slotted movable upper post element and co-operatively inter-fitting sliding (tongue) plate, with an operating mechanism located within a transverse (end gate) beam).

Thus, more specifically:

FIG. 16A shows a part cut-away, part-sectioned, end elevation of a telescopic support post, with a lower (static) post element serving as an upright to an end frame assembly, itself more readily apparent from FIGS. 17A and 17B;

FIG. 16B shows an elevation of the telescopic post assembly of FIG. 16A, taken from another side, showing a sideways or end-on view of multiple spaced, elongate rectangular profile, (load spreading) slots, disposed in a linear array along the span of a movable upper element; and FIG. 16C shows a section of FIG. 16B, depicting the location, span and lateral spread of a locking and support tongue, in relation to an inner movable upper post element and a stationary outer post and end frame member.

FIGS. 17A through 17C show end elevations of a container with telescopic (corner) support post adjustment, such as by the construction of FIGS. 16A through 16C, laterally bounding an end wall, but with respective upper portions extendible above the wall and fitted with opposed (movable) diagonal bracing.

Thus, more specifically:

FIG. 17A shows variability—through superimposed multiple alternative dispositions—in diagonal bracing disposition, for tracking various degrees of post extension;

FIG. 17B shows opposed diagonal bracing bar (ties or struts), for fully-extended posts, with a common cross-coupling or inter-pinning of lower brace ends; and FIG. 17C shows a sectional detail of common cross-pinning of diagonal bracing struts of FIGS. 17A and 17B, through a twin yoke, to a transverse rail bounding an upper side of an end wall, and within which the post latching of FIG. 16A can be accommodated.

Figure 18:
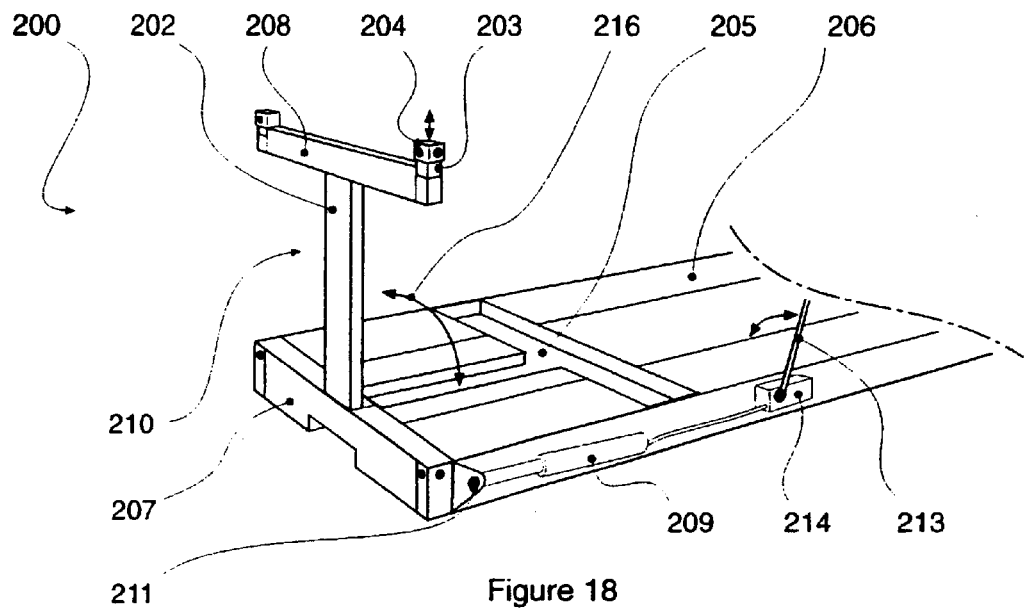

FIG. 18 shows a 'T' or 'I'-section folding end wall frame, with integral spaced capture fittings, upon extendible mountings, carried by an upper cross-bar; overall in a collapsible flat-rack container configuration, foldable into a complementary profiled recess in a base deck platform, with power drive assistance.

When erected the 'T/I' frame impedes end access and serves as an end load restraint to the deck platform, along with provision for container handling.

The 'T/I' frame dispenses with the need for individual full-height (corner) support posts, in favour of extendible stub posts.

Figure 19:
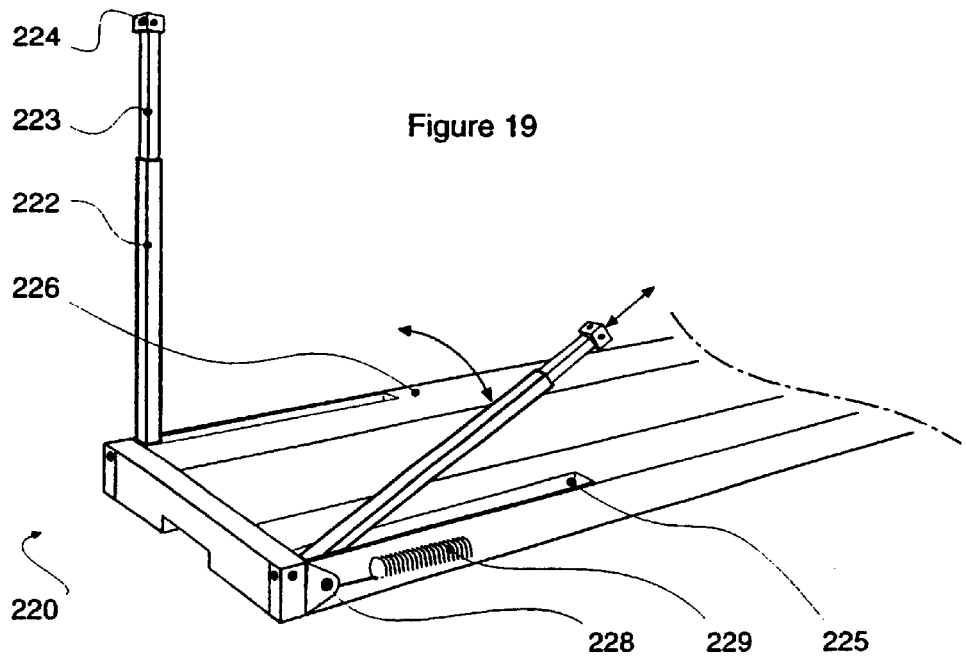

Nevertheless, where a loading regime dictates, supplementary upright bracing posts could be fitted to span between the upper and lower transverse beams—either demountably or accommodated in deck recesses, in the manner of FIG. 19.

With the 'T/I' frame folded into the deck platform recess, a compact, stackable, overall flat-pack container configuration is achieved, for return-empty/unladen mode.

FIG. 19 shows is folding individual telescopic corner support posts, collapsible—upon (full) retraction—into respective (complementary profiled) recesses in a base deck platform, with spring bias assistance.

DISCUSSION OF DRAWINGS

Referring to the drawings, variant constructions of telescopically adjustable (corner) support posts or struts 12 are depicted in FIGS. 1A through 2B, FIGS. 3A through 3C and FIGS. 4A through 4C.

For convenience, the same references are use for corresponding parts of common structure in those variants.

The posts 12 are depicted generally upright, for installation at certain strategic locations (the corner extremities being a particular case) upon a container deck (not shown), such as that of the other embodiments later described.

However, demountable, collapsible, folding, or tilting, post variants, such as of FIG. 19, are tenable, with the same inner construction.

Similarly, the posts 12 may be installed along with other features, such as folding end portions, such as of FIGS. 5A and 5B; transverse headers, such as of FIGS. 7A through 10B; end gates, such as of FIGS. 13A through 15B; and diagonal bracing, such as of FIGS. 16A through 17C.

In FIGS. 1A through 4C, a longitudinally (or lengthwise) adjustable, elongate (corner) support post 12 comprises an upper (and inner) post element 14, configured as a telescopic sliding fit, within a hollow lower (and outer) post element 15.

Broadly, the post 12 is extendable, between a fully erected or extended condition, depicted by its uppermost end level 25A of FIG. 1A—and a fully retracted or lowered condition, depicted by a corresponding other upper level 25B in FIG. 1C.

The post 12 carries, at its upper end, a handling, suspension and support 'capture' fitting 18 (such as a proprietary so-called 'twist-lock').

The capture fitting 18 is generally compatible with, or conforms to, prescribed containerisation standards, to allow container lifting and stacking—such as with crane or dedicated loader vehicle (overhead or side gantry and jib) lifts at container ports.

An internal, manually-operable, inter-connection, latching and support mechanism determines the relative post element deployment dispositions.

More specifically, a combined (inter-)connecting, operating, latching and support bar 16 is configured as a depending or hanging swing arm, carried internally of, and selectively operable between, the upper and lower post elements 14, 15.

The connecting bar 16 carries a retention ring or entrainment loop 13 at its upper end, receiving a locating and support pin 17, carried indirectly by the lower end walls of the upper post element 14.

The bar 16 thus effectively hangs, suspended from the pin 17, itself (rotatably) supported upon a cross-plate or bridge 27, within the upper post element 14.

The lower end of the connecting bar 16 carries a transverse 'T' bar 26, and adjacent handle 28.

The 'T' bar 26 is locatable in a selectable one of a series (in this case a pair) of longitudinally-spaced abutment stops, (inclined) support ledges, ramp surfaces or profiled detent slots 22, 23, in (pair of spaced) latch plates 21, themselves secured to the inner wall of the lower post element 15, at lower-mid span.

When 'sat' upon the upper ledge 22, the 'T' bar 26 can transmit stacking loads from the upper post element 14 downwards to the lower post element 15.

An internal transverse bridge plate 29 within the mid-upper portion of the lower post element 15, overlies the upper ledge 22 and the 'T' bar 26 when resting thereupon—and so restrains the 'T' bar 26 from movement away from the upper ledge 22, upon lifting loads, relayed to the connecting bar 16, through the upper post element 14.

Thus, the connecting bar 16 can relay either, or both, lifting and stacking loads between upper and lower post elements 14, 15.

For the upper support ledge 22, a modest degree of ledge inclination or slope (downward and to the right as shown in FIGS. 1A through 1C) is sufficient to encourage, promote or bias the 'T'-bar downwards and inward—once 'inserted', that is with its underside resting upon the upper ledge 22, and so able to carry downward (eg stacking) load, from the upper post element 14.

In the fully retracted post condition, of FIG. 1C, the 'T' bar 26 is located beneath the abutment ledge 23.

Supplementary ledges or slots could be incorporated in the latch plate 21, to provide additional rest positions for the relative disposition of post elements 14, 15.

Similarly, additional 'T' bars or the like could be fitted to the connecting bar, to provide bi-directional latching—ie restraint against either or both suspension and stacking loads.

A security lock, in this case a pivoted or rotary pawl detent 24, is operative, as shown in FIGS. 1A and 1C, to bear against the lower end of the connecting bar 26, in order to retain it securely in one or other of the detent slots 22, 23.

A compression bias spring 19 reacts between (to bias apart) the upper and lower post elements 14, 15, through end plates (not shown)—and so effectively carries most, if not all, of the weight of the upper post element 14, facilitating its mobility manually.

Bridging plates 27, 29 in the upper and lower post elements 14, 15 respectively, carry (directly or indirectly) spring 19 reaction loads.

The spring 19 is pre-compressed, even in the fully extended condition of the post 12, as shown in FIG. 1A—and is even further compressed in the fully retracted post condition, as shown in FIG. 1C.

The spring 19 axis could be slightly inclined to the post 12 axis, by somewhat off-setting the opposite ends of the spring 19, to take up any lateral clearance or 'play' between the upper and lower post elements 14, 15.

Similarly, by transferring a proportion of the spring 19 load to the connecting bar 16 and aligning the spring 19 axis somewhat more to the connecting bar 16, when swung to one side, a modest sideways or lateral bias component could be introduced, tending to urge the lower end of the connecting bar 16 sideways—in this case to the right, as shown in FIGS. 1A through 1C.

This in turn encourages the connecting bar 16 lower end more firmly and securely into the retention ledge 22, 23 in the latch plate 21 in the lower post element 15.

Operationally, in order to adjust the relative dispositions of the upper and lower post elements 14, 15, the detent 24 is initially 'disabled'—in this case, by rotating the pawl.

This allows the connecting bar 16 to be swung to one side, using the handle 28—such as depicted in FIG. 1B, in order to unlatch the 'T' bar from the ledge 22.

By pulling downward upon handle 28, against the spring 19, the upper post element 14 can be brought downward—ultimately to the fully retracted condition depicted in FIG. 1C—whereupon the 'T' bar 26 can be re-located beneath the lower ledge 23 on the underside of the latch plate 21.

The in-filled arrows in FIGS. 1B and 1C reflect the handle and detent movement and attendant relative post element adjustment.

The handle 28 is accessible through a generously-sized aperture (not shown) in the lower side wall of the lower post 15.

Similarly, smaller viewing apertures (again not shown) are incorporated in the lower side wall of the lower post 15, in the region of, and somewhat around the ledges 22, 23, to enable an operator to deploy the 'T' bar in relation thereto.

Generally, the transverse pin 17 serves for both location and retention of the upper post element 14—and can be inserted in, or removed from, the upper post element 14, for ease of assembly and dis-assembly.

Once the pin 17 is removed, the upper post element 14 is effectively released, and so can be withdrawn and separated from the lower post element 15—urged initially by release of the pre-compression of the spring 19.

The cross-sectional profile and dimensions of the pin 17 can be a somewhat 'slack' or loose fit in a transverse locating aperture, or through hole (not apparent) in the upper post element 14, to accommodate lateral swinging action of the connecting bar 16.

Profile

In the embodiments, the (support) pin 17 is depicted as a (cross) bar with a rectangular, in particular square, shank—but other profiles or contours are tenable.

That said, rectilinear profiles are generally preferred, for pin or bar and attendant support surface, for more effective load spreading, than may be obtainable with curved, in particular round or circular profiles, such as are commonly used for pin and slot inter-location.

Load concentration locally, promotes premature wear and even failure and a close-inter-fit or conformity may prove more difficult to achieve and sustain.

Multi-faceted—ie multiple flat faced—profiles (not illustrated) may also be tenable, although more complex to fabricate than a rectangular, in particular square section.

In the variant of FIGS. 3A through 3C, individual notches 31, 33, in an indexing plate 32, provide multiple (in this case two) detents for the bar 16.

At each detent the bar 16, and therefor the upper post element 14, is restrained from either upward or downward movement.

Greater incremental choice in detent location for the bar 16—and thus relative disposition of the upper and lower post elements 14, 15—is afforded in the variant of FIGS. 4A through 4C, through a rack plate 36 in the lower post element 15 selectively engaged by a complementary toothed pawl 35 carried by the bar 16.

As an alternative—or indeed to supplement—the telescopic post approach to longitudinal span variability, a folding end post arrangement, such as depicted in FIGS. 5A and 5B may be employed.

Thus, a stub post element 39, carrying a container capture and handling fitting 40, is pivotally mounted upon a main post 38, through an offset hinge 37.

FIG. 5A depicts stub 39 erected and aligned with the main post 38, and FIG. 5B the stub 39 swung away to hang downwardly from the hinge 37, alongside the post 38.

A latch or lock (not shown) may be fitted between stub 39 and post 38 to preserve the selected relative disposition.

FIGS. 6A through 6C depict use of telescopic posts 42, such as of FIGS. 1A through 4C, to accommodate variability in height or depth of a load 48, upon a container platform deck 46.

Upper post extensions 43, carrying respective container capture and handling fittings 44, can be deployed, from a retracted position, somewhat below the load 48, as depicted in FIG. 6A, to somewhat above the load 48, as depicted in FIG. 6B.

Post 42 extension enables another container 41B to be stacked upon a lower container 41A, despite an otherwise protruding load 48.

FIGS. 7A and 7B show a dedicated railway freight container 51, incorporating longitudinally adjustable or extendable (corner)-support posts 52, with upper post extensions 53, carrying capture and handling fittings 54.

Post 52 construction could reflect that of FIGS. 1A through 4C.

Thus opposed pairs of (corner) support posts 52 surmount opposite ends of a common flat-bed, platform chassis 56 and are transversely braced, at their corresponding upper ends, by a bridge or header beam 55.

The header 55, or at least its upper surface, has an incremental or stepped arch, inverted 'U' or 'C'-section, profile.

This is in order to fit within prescribed railway tunnel gauges 50, 60 (depicted in FIG. 7A)—reflecting in this case UK national and European track standards, both imposing a more severe overall height restriction, in particular at the opposite container sides, than at mid-span.

Container profiles are generally rectangular, whereas railway (and indeed road) 'bored' tunnel sections are generally not.

Advantage needs to be taken of all the available height at any span position, in order to optimise load capacity—albeit, if necessary, with some load (re-)disposition or configuration adaptation.

The arched profile of the bridge beam 55, extends above the height of its lateral (corner) support posts 52, and so—absent special provision—would impede access to the capture fittings 54 (such as proprietary so-called twist-locks), located at the upper ends of the post extensions 53.

Accordingly, provision is incorporated, for upper end post extensions 53—as depicted in FIG. 7B, to bring the capture fittings 54 somewhat proud of the beam 55 and thus accessible to standard overhead suspension cradles, from cranes or dedicated loader vehicles.

A similar consideration applies to container stacking—where again, unimpeded access to capture fittings 54 is required.

Thus the container 51, configured as in FIG. 7B—that is with (corner) support posts 52 extended at their upper ends 53—is available to support an overlying container, whether of this same particular kind, or another type, meeting a common base foot-print standard.

FIGS. 8A through 9B depict transverse header mobility to accommodate internal load height and external tunnel gauge diversity.

Thus, in FIGS. 8A and 8B, a header 65 is integrated with lateral post elements 67, fitted telescopically into lateral support posts 62, and spanning a deck 66.

Stub extensions 63, carrying capture and handling fittings 64, are deployable, as depicted in FIG. 8A, to bring the fittings 64 above the header 65.

A deeper section header 75 is featured in FIGS. 9A and 9B, is movably mounted, for travel upwards and downwards, in relation to a deck platform 76, upon lateral support posts 72.

Header mobility also regulates container end access and load end restraint.

The posts 72 retain end stub extensions 73, carrying capture and handling fittings 74.

FIGS. 10A and 10B depict a multiple (in this case twin) stacked deck, dedicated vehicle transporter container 100, configured as a railway carriage.

The container 100 is generally of fixed inner loading profile, or internal capacity, but variable outer profile—to address conflicting requirements of meeting containerisation dimensional standards, for handling and yet fitting railway through-passage limitations.

A (vehicle) load 112, 113 fits within the confines of a fixed-profile frame, of opposed support posts 101, surmounted by a transverse header beam 102.

The external upper profile of header 102 is adjustable, through multiple interconnected links 103, 104, 105, for conformity with standard tunnel gauge, bridge or overhead gantry clearance—represented by (alternative broken line) profiles 110 in FIG. 10B.

Operationally, reliance may placed upon an ability to bring vehicles on the upper and lower decks somewhat closer together, after loading—for example in the manner envisaged in the Applicant's co-pending UK Patent Application No. 9911483.7.

FIG. 10A depicts a bounding frame 103, 104, 105 fully-erected, for overall container 100 handling and stacking.

By erecting, from a collapsed condition (depicted in FIG. 10B) underlying support links 105, outer opposed ears 104, carrying respective handling fittings 106, at their upper outermost ends, are swung upwards, about inboard pivots 107, at the outer ends of a central bridge 103.

The links 103, 104 and 105 could be operated manually, from externally of the container 100, and/or by coupling to telescopic mechanisms, such as that described in FIGS. 1A through 1C, internally of the lateral support posts 101.

FIG. 10B depicts upper frame re-profiling, for conformity with a standard tunnel gauge profile, through which the carriage must fit for safe running freedom.

Indeed, the entire upper header 102 could be re-profiled (that is both internally and externally—by omitting a fixed header), say to fit into closer conformity with the load upper profile, when constrained externally by tunnel gauge transit.

Internal load support deck and attendant (vehicle) load re-disposition (not shown) could be used in conjunction with container outer contour re-profiling.

FIG. 11 shows a generalised container 41—such as of FIGS. 6A through 6B (the same references being used for corresponding parts).

Thus, an elongate rectangular platform deck 46 is surmounted at each corner extremity by an upright (telescopically adjustable) corner support post 42, with an extendible upper element 43, carrying a capture and handling fitting 44.

FIG. 12 shows a similar container to FIG. 11, but with the transverse header of FIGS. 7A and 7B, the same references being used for corresponding parts.

Thus telescopically adjustable (corner) support posts 52 are again grouped in opposed pairs upon a platform deck 56, with an intervening fixed transverse header bracing beam 55, profiled for conformity with an external tunnel gauge 60.

An overhead cradle 81, suspended by slings 82, can address the capture fittings 54, once each post 52 is extended 53 to bring the fitting 54 above the header beam 55.

FIGS. 13A through 14B depict hinged mounting of gates or doors 157, 158, in pairs, upon opposed (corner) support posts 152 at a container end—the same references being used for corresponding features.

The support posts 152 could reflect the telescopic constructions of FIGS. 1A through 4C, with movable upper post elements 153 carrying a capture and handling fittings 154.

Such paired gates 157, 158 regulate end load access, end load restraint and, when closed and intercoupled, provide transverse bracing (between attendant posts)—promoting overall structural rigidity of the container.

Gate intercoupling is conveniently through marginal overlap of the outboard (ie away from the inboard hinges) gate ends and cross-pins 159, which prevent gate opening and impede relative gate twisting movement in the shared 'closure plane'.

Upon uncoupling, the gates 157, 158 may be swung open to align with the container sides, either projecting beyond the deck platform 156 or folded back, as depicted in FIGS. 13B and 14B.

The gates 157, 158 could be demountable, say through a split hinge mounting to the associated support posts 152.

In FIGS. 13A and 13B, the gates 157, 158 are set generally at an intermediate height, in relation to an underlying platform deck 156.

Such an intermediate gate disposition may be used in conjunction with an overlying header (not shown) between upper post ends—or to substitute, albeit at a lower level, for the transverse bracing role of such an upper header, in a similar fashion, by tying together the associated support posts 152.

On the other hand, in FIGS. 14A and 14B, the gates 157, 158 are set at the upper ends of support posts 152, and when closed to lie transversely of the deck platform 156, as depicted in FIG. 14A, can fulfil the role of a header.

In that sense, the upper gates of FIGS. 14A and 14B can be regarded collectively as a 'split' header (beam).

With either intermediate or 'split-header' configuration, gate disposition, the particular height in relation to the deck platform 156, could be adjustable—say, by extension or retraction of the attendant support post.

Thus, in the case of FIGS. 14A and 14B, the split header could share the mobility of the unitary header variants of FIGS. 8A through 9B.

FIGS. 15A and 15B reflect variant paired end gate or door 187, 188 configurations, using a deeper door, extending downwards to couple with a platform deck 186, for enhanced post to deck bracing, even when opened, and affording a greater area for overlap and inter-coupling, when closed.

FIG. 15A shows a single platform deck container, or flat-rack 180, whereas FIG. 15B shows a multiple deck container 190.

Again the same references are used for corresponding parts or features.

Paired gates 187, 188 are pivotally mounted, from hinges 194, upon opposed support posts 182, with extendible upper post elements 183, carrying capture and handling fittings 184.

Gate 187, 188 inter-coupling is by an array of apertures 192 and selectively deployed coupling pins 191.

Gate-to-deck coupling is through sliding bolt pins 193, locating in holes (not shown) in the deck or side chassis rail, or collar fittings on the side face thereof.

In FIG. 15B, an upper deck 189 is coupled to an 'open' (or longitudinally aligned) door 187, through pin and slot couplings 191, 192.

Thus, the apertures 192 in the doors 187,188 are available for selective alignment with corresponding apertures (not shown) in side beams of the upper deck 189, allowing insertion of locating pins 191 to secure the doors 187, 188 to the deck 189.

Pin or bolt coupling 193 can be used between doors 187, 188 and the lower deck 186, to which the lower door edges are closely adjacent.

In any event, the doors 187, 188 are indirectly coupled to the lower deck 181 through their hinged mounting upon associated posts 182, themselves fast with the deck.

The doors 187, 188 may also be demountable altogether, conveniently through split hinges 194—although this is not shown.

A variant telescopic support post 120 construction of FIGS. 16A through 16C provides a robust, load-spreading, adjustment mechanism, and post bracing, through a transverse end wall and diagonal struts or ties, as depicted in FIGS. 17A and 17B.

Overall container (torsional) rigidity is enhanced by such bracing.

Thus, a movable (upper) inner post element 121 telescopically inter-fits with a fixed lower outer post element 122, constituting a side frame to an end wall 141.

A series of elongate, generally rectangular, profile slots 123 in the upper post element 121 are available for selective alignment with a locating and support tongue plate 125, with a handle 127, accessible through an aperture (not shown) in the side wall of a transverse beam 129.

The upper end of the movable post element 121 carries a capture and handling fitting 136.

The upper end of the lower fixed post element 121 is secured to the transverse beam 129, serving as an upper rail of the end wall 141.

A diagonal bracing bar 132—serving as strut or tie according to imposed compression or tension loading—spans from the capture fitting 136 to the transverse rail 129, as more readily appreciated from FIGS. 17A and 17B.

More particularly, the capture fitting 136 carries lateral lugs 139, with apertures (not shown), to locate a coupling pin 137, passing through an aligned aperture in the upper end of the link 132.

A similar removable coupling pin arrangement at the lower end of the link 132 allows selective re-positioning upon a multiple slotted adjustment twin 'U' channel-section rail 142, surmounting the transverse gate header beam 129 (FIGS. 17A–17C).

This configuration accommodates a corresponding diagonal bracing link 133, from the upper end of an opposite (corner) support post 130, to the beam 129.

FIG. 17A maps, by superimposition, the geometry of alternative post 120, 130 extension and corresponding location of respective diagonal bracing 132, 133.

The disposition lines representing opposed post bracing variously intersect at intermediate post extensions, but at full extension, as depicted in FIG. 17B, the brace ends overlap and can be tied by a common coupling pin 148, as in FIG. 17C.

The entire support post, end wall and diagonal bracing assembly upstands from a deck chassis beam 145—rigidly, demountably or movably, for example by folding collapse over the deck or within a deck recess, much as in the collapse recess arrangements of FIGS. 18 and 19.

Similarly, the end gate 141 could be fixed or movable.

A split gate construction is hinted at in FIG. 17B, with a central dividing upright 146 in the end wall panel. This could carry diagonal bracing loads direct to the deck chassis 145.

A variant of container end wall collapse is explored in FIG. 18, for a platform deck or flat-rack container 200.

A collapsible folding end frame 210 is of an overall '1' or 'T' configuration, with an centrally disposed leg 202, upstanding from a pivoted transverse deck beam 207, and supporting an upper cross-beam 208.

At the opposite outer ends of the cross-beam 208, subsidiary extendible post stubs 203 carry end capture fittings 204, for overall container handling.

A hydraulic or pneumatic actuator 209, primed by a pump 214 and operating lever 213, reacts between the chassis 206 and a pivot bracket 211, to swivel the transverse beam 207 and so tilt the entire end gate 210—from a fully erected condition, upstanding from the deck as illustrated, to a collapsed condition (not shown), over an arcuate range of movement 216.

A bespoke complementary profiled recess 205 in the deck platform 206 accommodates the end frame 210, when fully retracted.

FIG. 19 illustrates a corresponding arrangement to FIG. 18, but configured for individual folding support post collapse.

Thus, telescopic support post 222, with an extendible upper post element 223 and end capture fitting 224, is carried by a pivot mounting 228 at its lower end, locatable, upon collapse, within a bespoke profiled recess 225 in the deck platform 226 of a platform container 220.

A bias spring 229 is operative between the deck 226 and the pivot mounting 228 to assist post erection and/or collapse.

| Component List | |
|---|---|
| 12 | corner post or strut |
| 13 | capture ring |
| 14 | upper post element |
| 15 | lower post element |
| 16 | connecting bar |
| 17 | pivot & retention pin |
| 18 | handling and support capture fitting |
| 19 | compression spring |
| 21 | latch plate |
| 22 | recess/slot/ledge |
| 23 | underside |
| 24 | detent or lock |
| 25A | upper condition |
| 25B | lower condition |
| 26 | transverse or 'T' bar termination |
| 27 | plate |
| 28 | handle |
| 29 | plate |
| 31 | notch |
| 32 | index plate |
| 33 | notch |
| 35 | toothed pawl |
| 36 | rack plate |
| 37 | hinge |
| 38 | main post element |
| 39 | stub post element |
| 40 | capture and handling fitting |
| 41A | lower container |
| 41B | upper container |
| 42 | (telescopic) support post |
| 43 | upper post extension |
| 44 | capture and handling fitting |
| 46 | deck/platform |
| 48 | load |
| 50 | railway tunnel gauge |
| 51 | (railway freight) container |
| 52 | extendible (corner) support post |
| 53 | upper post extension |
| 54 | capture and handling fitting |
| 55 | arched bridge beam |
| 56 | platform chassis |
| 60 | railway tunnel gauge |
| 62 | support post |
| 63 | stub extension |
| 64 | capture and handling fitting |
| 65 | header |
| 66 | deck/platform |
| 67 | extendible post element |
| 72 | support post |
| 73 | stub extension |
| 74 | capture and handling fitting |
| 75 | header |

-continued

Component List

| | |
|---|---|
| 76 | deck/platform |
| 81 | overhead cradle |
| 82 | slings |
| 100 | container |
| 101 | support post |
| 102 | header beam |
| 103 | link |
| 104 | link |
| 105 | link |
| 106 | capture and handling fitting |
| 107 | pivot |
| 110 | tunnel gauge |
| 112 | vehicle load |
| 113 | vehicle load |
| 120 | telescopic support post |
| 121 | (upper) inner post element |
| 122 | (lower) outer fixed post element |
| 123 | slot |
| 125 | tongue plate |
| 127 | handle |
| 129 | transverse beam/end wall header rail |
| 130 | (opposite) telescopic support post |
| 132 | bracing link/brace |
| 133 | (opposite) bracing link/brace |
| 136 | capture and handling fitting |
| 137 | coupling pin |
| 139 | lateral lug |
| 141 | end wall |
| 142 | channel rail |
| 145 | deck chassis beam |
| 146 | central dividing upright post |
| 148 | coupling pin |
| 152 | support posts |
| 153 | upper post element |
| 154 | capture and handling fitting |
| 156 | deck/platform |
| 157 | gates/doors |
| 158 | gates/doors |
| 159 | cross-pin |
| 180 | (flat rack) container |
| 181 | deck platform |
| 182 | support post |
| 183 | upper post element |
| 184 | capture and handling fitting |
| 186 | (lower) platform deck |
| 187 | gate |
| 188 | gate |
| 189 | (upper) platform deck |
| 190 | (multiple deck) container |
| 191 | coupling pin |
| 192 | aperture |
| 193 | bolt |
| 194 | hinge |
| 200 | (flat rack) container |
| 202 | central leg/post |
| 203 | extendible post stubs |
| 204 | capture and handling fitting |
| 205 | recess |
| 206 | chassis |
| 207 | transverse deck beam |
| 208 | cross beam |
| 209 | hydraulic or pneumatic actuator |
| 210 | end frame |
| 211 | pivot bracket |
| 213 | operating lever |
| 214 | pump |
| 216 | arcuate range |
| 220 | (platform) container |
| 222 | support post |
| 223 | extendible upper post element |
| 224 | capture and handling fitting |
| 225 | recess |
| 226 | deck platform |
| 228 | pivot mounting |
| 229 | bias spring |

What is claimed is:

1. A container comprising a load deck, upstanding support posts on opposite sides of the deck, container capture and handling fittings at the upper ends of the posts, and a transverse header extending between the posts and having a profile which is lower near the posts and higher between them, the posts being adjustable between an extended position in which the fittings are accessible above the higher portion of the header and a retracted position in which the fittings are below the higher portion of the header.

2. The container of claim 1 wherein the profile of the header corresponds to the shape of an opening through which the container is to be transported.

3. The container of claim 1 wherein the header is movably mounted on the posts.

4. The container of claim 1 wherein the header is mounted between movable portions of the posts.

5. The container of claim 1 wherein the header is disposed to determine deck end access and load restraint.

6. The container of claim 1 wherein the header provides transverse bracing for the posts.

7. The container of claim 1, configured for dedicated vehicle transportation.

8. A container comprising a deck, a plurality of upstanding support posts extending from the deck and having fittings at their upper ends, the posts being axially extensible to allow access to the fittings, end gates or doors hung in opposed pairs from respective ones of the support posts, and a gate coupling operable to combine the gates into a transverse post brace.

9. A container comprising upper and lower decks spaced vertically apart, a plurality of upstanding support posts extending between the decks and having fittings at their upper ends, the posts being axially extensible above the upper deck to allow access to the fittings, a common end gate or door, and couplings operable between the decks and the gate.

10. A container comprising a deck, a pair of upstanding support posts each having a first section mounted in a fixed position relative to the deck and a second section which is axially extensible relative to the first section, a rail extending between the lower sections of the posts, and bracing connected to the upper sections of the posts and to different points along the rail when the upper sections are extended to different positions.

11. A container for use in transporting a load, comprising a deck with at least one upstanding post having a first section mounted in a fixed position relative to the deck, a second section which is axially extensible relative to the first section, a support bar pivotally connected to one of the sections Internally of the post, a plurality of axially facing shoulders in fixed positions within the other section, and means operable externally of the post for moving the support bar Into and out of position for abutting engagement with the shoulders to selectively lock the two sections together in extended and retracted positions and to permit movement of the second section between the extended and retracted positions.

12. The container of claim 11 wherein one of the shoulders faces in an upward direction for transferring stacking loads between the two post sections, and another one of the shoulders faces in a downward direction for transferring pulling loads between the two sections.

13. The container of claim 11 wherein the first post section is pivotally mounted to the deck for movement between horizontal and vertical positions.

14. The container of claim 11 wherein the support bar has a relatively flat detent of rectangular cross section which engages the shoulders to lock the two sections together.

* * * * *